(12) United States Patent
Nakao et al.

(10) Patent No.: US 8,514,908 B2
(45) Date of Patent: *Aug. 20, 2013

(54) INTEGRATED CIRCUIT FOR RESPONSE SIGNAL SPREADING

(75) Inventors: Seigo Nakao, Kanagawa (JP); Daichi Imamura, Kanagawa (JP); Akihiko Nishio, Kanagawa (JP); Masayuki Hoshino, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/493,887

(22) Filed: Jun. 11, 2012

(65) Prior Publication Data

US 2012/0281732 A1 Nov. 8, 2012

Related U.S. Application Data

(63) Continuation of application No. 13/284,533, filed on Oct. 28, 2011, now Pat. No. 8,223,818, which is a continuation of application No. 12/947,224, filed on Nov. 16, 2010, now Pat. No. 8,073,037, which is a continuation of application No. 12/665,260, filed as application No. PCT/JP2008/001567 on Jun. 18, 2008, now Pat. No. 8,073,038.

(30) Foreign Application Priority Data

Jun. 19, 2007 (JP) .................................. 2007-161969

(51) Int. Cl.
*H04B 1/00* (2006.01)

(52) U.S. Cl.
USPC ........... 375/141; 370/209; 370/328; 455/450; 455/456.5; 455/525; 455/561; 707/699; 708/410

(58) Field of Classification Search
None
See application file for complete search history.

(56) References Cited

U.S. PATENT DOCUMENTS

| 6,754,251 B1 | 6/2004 | Sriram et al. |
| 2007/0098096 A1 | 5/2007 | Akita et al. |

(Continued)

FOREIGN PATENT DOCUMENTS

| JP | 2005-333344 A | 12/2005 |
| JP | 2007-124593 A | 5/2007 |

(Continued)

OTHER PUBLICATIONS

NTT DoCoMo, Fujitsu, Mitsubishi Electric, "Implicit Resource Allocation of ACK/NACK Signal in E-UTRA Uplink," R1-072439, 3GPP TSG RAN WG1 Meeting #49, Kobe, Japan, May 7-11, 2007, pp. 1-3.

(Continued)

*Primary Examiner* — Adolf Dsouza
(74) *Attorney, Agent, or Firm* — Seed IP Law Group PLLC

(57) ABSTRACT

A radio communication apparatus receives control information on one or more control channel elements (CCEs) with consecutive CCE number(s). The radio communication apparatus first-spreads a response signal with a sequence defined by a cyclic shift value that is determined among a plurality of cyclic shift values from an index of physical uplink control channel (PUCCH), which is associated with a first CCE number of the one or more CCEs, and second-spreads the first-spread response signal with an orthogonal sequence that is determined among a plurality of orthogonal sequences from the index. One of cyclic shift values used for an orthogonal sequence is determined from an index of the PUCCH, which is associated with an odd CCE number, and another one of the cyclic shift values used for the same orthogonal sequence is determined from an index of the PUCCH, which is associated with an even CCE number.

30 Claims, 16 Drawing Sheets

(56) References Cited

U.S. PATENT DOCUMENTS

| | | | |
|---|---|---|---|
| 2007/0141443 | A1 | 6/2007 | Brown |
| 2008/0080467 | A1 | 4/2008 | Pajukoski et al. |
| 2008/0268860 | A1 | 10/2008 | Lunttila et al. |
| 2008/0293424 | A1* | 11/2008 | Cho et al. .................. 455/450 |
| 2008/0298488 | A1 | 12/2008 | Shen et al. |
| 2008/0310539 | A1 | 12/2008 | Kowalski |
| 2008/0310540 | A1 | 12/2008 | Tiirola et al. |
| 2009/0303929 | A1 | 12/2009 | Yamamoto et al. |
| 2010/0067461 | A1 | 3/2010 | Kwak et al. |
| 2010/0103902 | A1 | 4/2010 | Kim et al. |

FOREIGN PATENT DOCUMENTS

| | | |
|---|---|---|
| JP | 2009-520319 A | 5/2009 |
| JP | 2010-122968 A | 6/2010 |
| WO | 99/48227 A1 | 9/1999 |
| WO | 2008/053930 A1 | 5/2008 |

OTHER PUBLICATIONS

"3rd Generation Partnership Project; Technical Specification Group Radio Access Network; Evolved Universal Terrestrial Radio Access (E-UTRA); Physical Channels and Modulation (Release 8)," Technical Specification 3GPP TS 36.211 (V8.3.0), 3rd Generation Partnership Project (3GPP™), Valbonne, France, May 2008.

Burström et al., "Uplink Control Channel in E-UTRA, Radio Link and Radio Network Evaluation," IEEE Wireless Communications and Networking Conference (WCN 2008), Las Vegas, NV., Mar. 31-Apr. 3, 2008, pp. 835-839.

"Coherent Uplink ACK/NAK Transmission With High Speed UEs," Report R1-072857, 3GPP TSG RAN WG1 Meeting #49, Orlando, FL, Jun. 25-29, 2007, 6 pages.

"Coherent Uplink ACK/NAK Transmission With High Speed UEs," Report R1-073429, 3GPP TSG RAN WG1 Meeting #50, Athens, Aug. 20-24, 2007, 4 pages.

Extended European Search Report for corresponding EP Application No. 08776720.8, dated Jul. 19, 2011, 6 pages.

"Implicit Resource Allocation of ACK/NACK Signal in E-UTRA Uplink," R1-071650, 3GPP TSG RAN WG1 Meeting #48bis, St. Julians, Malta, Mar. 26-30, 2007, pp. 1-3.

International Search Report mailed Jul. 15, 2008, issued in corresponding International Application No. PCT/JP2008/001567, filed Jun. 18, 2008.

Motorola, "EUTRA SC-FDMA Uplink Pilot/Reference Signal Design," R1-063057, 3GPP RAN WG1 #47, Riga, Latvia, Nov. 6-10, 2006, pp. 1-5.

"Multiplexing Capability of CQIs and ACK/NACKs Form Different UEs," Report R1-072315, 3rd Generation Partnership Project (3GPP™) TSG RAN WG1 Meeting #49, Kobe, Japan, May 7-11, 2007, 4 pages.

Nokia, "Multiplexing of L1/L2 Control Signaling when UE has no data to transmit," R1-063380, 3GPP TSG RAN WG1 #47, Riga, Latvia, Nov. 6-10, 2006, 6 pages.

Office Action, dated Feb. 2, 2012, for corresponding Russian Application No. 2009147261/07(067333), 8 pages. (with English Translation).

"Ordering of the implicit resource allocation table for Uplink ACK/NACK," Report R1-074918, 3GPP TSG RAN WG1 Meeting #51, Jeru, Korea, Nov. 5-9, 2007, 4 pages.

"Selection of Orthogonal Cover and Cyclic Shift for High Speed UL ACK," Report R1-073564, 3GPP TSG RAN WG1 Meeting #50, Athens, Aug. 20-24, 2007, 5 pages.

"Usage of Cyclic Shifts and Block-Wise Spreading Codes for Uplink ACK/NACK," Report R1-073618, 3GPP TSG RAN WG1 Meeting #50, Athens, Aug. 20-24, 2007, 5 pages.

Notice of the Reasons for Rejection, dated Aug. 7, 2012, for corresponding Japanese Application No. 2010-158001, 3 pages.

* cited by examiner

| | Walsh 0 | Walsh 1 | Walsh 2 |
|---|---|---|---|
| 11 | | | |
| 10 | PUCCH #6 | PUCCH #7 | PUCCH #18 |
| 9 | | | |
| 8 | PUCCH #5 | PUCCH #8 | PUCCH #17 |
| 7 | | | |
| 6 | PUCCH #4 | PUCCH #9 | PUCCH #16 |
| 5 | | | |
| 4 | PUCCH #3 | PUCCH #10 | PUCCH #15 |
| 3 | | | |
| 2 | PUCCH #2 | PUCCH #11 | PUCCH #14 |
| 1 | | | |
| 0 | PUCCH #1 | PUCCH #12 | PUCCH #13 |

CYCLIC SHIFT VALUE OF ZC SEQUENCE(0~11) ↑
WALSH SEQUENCE NUMBER(0~2) →

FIG.4

INTEGRATED CIRCUIT FOR RESPONSE SIGNAL SPREADING

TECHNICAL FIELD

The present invention relates to a radio communication apparatus and response signal spreading method.

BACKGROUND ART

In mobile communication, ARQ (Automatic Repeat Request) is applied to downlink data from a radio communication base station apparatus (hereinafter abbreviated to "base station") to radio communication mobile station apparatuses (hereinafter abbreviated to "mobile stations"). That is, mobile stations feed back response signals representing error detection results of downlink data, to the base station. Mobile stations perform a CRC (Cyclic Redundancy Check) of downlink data, and, if CRC=OK (no error), feed back an ACK (ACKnowledgement), and, if CRC=NG (error present), feed back a NACK (Negative ACKnowledgement), as a response signal to the base station. These response signals are transmitted to the base station using uplink control channels such as a PUCCH (Physical Uplink Control CHannel).

Also, the base station transmits control information for reporting resource allocation results of downlink data, to the mobile stations. This control information is transmitted to the mobile stations using downlink control channels such as L1/L2 CCH's (L1/L2 Control CHannels). Each L1/L2 CCH occupies one or a plurality of CCE's. If one L1/L2 CCH occupies a plurality of CCE's (Control Channel Elements), the plurality of CCE's occupied by the L1/L2 CCH are consecutive. Based on the number of CCE's required to carry control information, the base station allocates an arbitrary L1/L2 CCH among the plurality of L1/L2 CCH's to each mobile station, maps control information on the physical resources associated with the CCE's (Control Channel Elements) occupied by the L1/L2 CCH, and performs transmission.

Also, to use downlink communication resources efficiently, studies are underway to associate PUCCH's with CCE's on a one-to-one basis. According to this association, each mobile station can decide the PUCCH to use to transmit a response signal from that mobile station, from the CCE corresponding to physical resources on which control information for that mobile station is mapped. That is, each mobile station maps a response signal from the subject mobile station on a physical resource, based on the CCE corresponding to physical resources on which control information for that mobile station is mapped.

Also, as shown in FIG. 1, studies are underway to perform code-multiplexing by spreading a plurality of response signals from a plurality of mobile stations using ZC (Zadoff-Chu) sequences and Walsh sequences (see Non-Patent Document 1). In FIG. 1, ($W_0$, $W_1$, $W_2$, $W_3$) represents a Walsh sequence having a sequence length of 4. As shown in FIG. 1, in a mobile station, first, an ACK or NACK response signal is subject to first spreading to one symbol by a ZC sequence (having a sequence length of 12) in the frequency domain. Next, the response signal subjected to first spreading is subject to an IFFT (Inverse Fast Fourier Transform) in association with $W_0$ to $W_3$. The response signal spread in the frequency domain by a ZC sequence having a sequence length of 12 is transformed to a ZC sequence having a sequence length of 12 by this IFFT in the time domain. Then, the signal subjected to the IFFT is subject to second spreading using a Walsh sequence (having a sequence length of 4). That is, one response signal is allocated to each of four symbols $S_0$ to $S_3$. Similarly, response signals of other mobile stations are spread using ZC sequences and Walsh sequences. Here, different mobile stations use ZC sequences of different cyclic shift values in the time domain or different Walsh sequence. Here, the sequence length of ZC sequences in the time domain is 12, so that it is possible to use twelve ZC sequences of the cyclic shift values "0" to "11," generated from the same ZC sequence. Also, the sequence length of Walsh sequences is 4, so that it is possible to use four different Walsh sequences. Therefore, in an ideal communication environment, it is possible to code-multiplex maximum forty-eight (12×4) response signals from mobile stations.

Here, there is no cross-correlation between ZC sequences of different cyclic shift values generated from the same ZC sequence. Therefore, in an ideal communication environment, a plurality of response signals subjected to spreading and code-multiplexing by ZC sequences of different cyclic shift values (0 to 11), can be separated in the time domain without inter-code interference, by correlation processing in the base station.

However, due to the influence of, for example, transmission timing difference in mobile stations, multipath delayed waves and frequency offsets, a plurality of response signals from a plurality of mobile stations do not always arrive at a base station at the same time. For example, if the transmission timing of a response signal spread by a ZC sequence of the cyclic shift value "0" is delayed from the correct transmission timing, the correlation peak of the ZC sequence of the cyclic shift value "0" may appear in the detection window for the ZC sequence of the cyclic shift value "1." Further, if a response signal spread by the ZC sequence of the cyclic shift value "0" has a delay wave, interference leakage due to the delayed wave may appear in the detection window for the ZC sequence of the cyclic shift value "1." That is, in these cases, the ZC sequence of the cyclic shift value "1" is interfered by the ZC sequence of the cyclic shift value "0." Therefore, in these cases, the separation performance degrades in a response signal spread by the ZC sequence of the cyclic shift value "0" and a response signal spread by the ZC sequence of the cyclic shift value "1." That is, if ZC sequences of adjacent cyclic shift values are used, the separation performance of response signals may degrade.

Therefore, up till now, if a plurality of response signals are code-multiplexed by spreading using ZC sequences, a difference of cyclic shift values (i.e. a cyclic shift interval) is provided between the ZC sequences, to an extent that does not cause inter-code interference between the ZC sequences. For example, when the difference between the cyclic shift values of ZC sequences is 2, only six ZC sequences of the cyclic shift values "0," "2" "4," "6," "8" and "10" amongst twelve ZC sequences of the cyclic shift values "0" to "11," are used in first spreading of response signals. Therefore, if Walsh sequences having a sequence length of 4 are used in second spreading of response signals, it is possible to code-multiplex maximum 24 (6×4) response signals from mobile stations.

Non-Patent Document 1: Multiplexing capability of CQIs and ACK/NACKs form different UEs (ftp://ftp.3gpp.org/TSG_RAN/WG1_RL1/TSGR1_49/Docs/R1-072315.zip)

DISCLOSURE OF INVENTION

Problems to be Solved by the Invention

As described above, if a Walsh sequence having a sequence length of 4, ($W_0$, $W_1$, $W_2$, $W_3$), is used in second spreading, one response signal is allocated to each of four symbols ($S_0$ to $S_3$). Therefore, a base station that receives response signals from mobile stations needs to despread the response signals over a time period of four-symbols. On the other hand, if a mobile station moves fast, there is a high possibility that the channel conditions between the mobile station and the base station vary during the above four-symbol time period. Therefore, when there is a mobile station moving fast, the orthogonality between the Walsh sequences used in second spreading may collapse. That is, when there is a mobile station moving fast, inter-code interference is more likely to occur between Walsh sequences than between ZC sequences, and, as a result, the separation performance of response signals degrades.

By the way, when some of a plurality of mobile stations move fast and the rest of the mobile stations are in a stationary state, the mobile stations in a stationary state, which are multiplexed with the mobile stations moving fast on the Walsh axis, are also influenced by inter-code interference.

It is therefore an object of the present invention to provide a radio communication apparatus and response signal spreading method that can minimize the degradation of the separation performance of response signals that are code-multiplexed.

Means for Solving the Problem

The radio communication apparatus of the present invention employs a configuration having: a first spreading section that performs first spreading of a response signal using one of a plurality of first sequences that can be separated from each other because of different cyclic shift values; and a second spreading section that performs second spreading of the response signal subjected to the first spreading, using one of a plurality of second sequences, and in which the first spreading section and the second spreading section perform the first spreading and the second spreading of the response signal, using the one of the plurality of first sequences and the one of the plurality of second sequences, the first sequences and the second sequences being associated with control channel elements based on a use probability of physical resources for response signals associated with control channel element numbers.

Advantageous Effect of Invention

According to the present invention, it is possible to minimize the degradation of the separation performance of response signals that are code-multiplexed.

BRIEF DESCRIPTION OF DRAWINGS

FIG. 4 illustrates associations of ZC sequences and Walsh sequences with PUCCH's according to Embodiment 1 of the present invention;

BEST MODE FOR CARRYING OUT INVENTION

Embodiments of the present invention will be explained below in detail with reference to the accompanying drawings.

Figure 2:
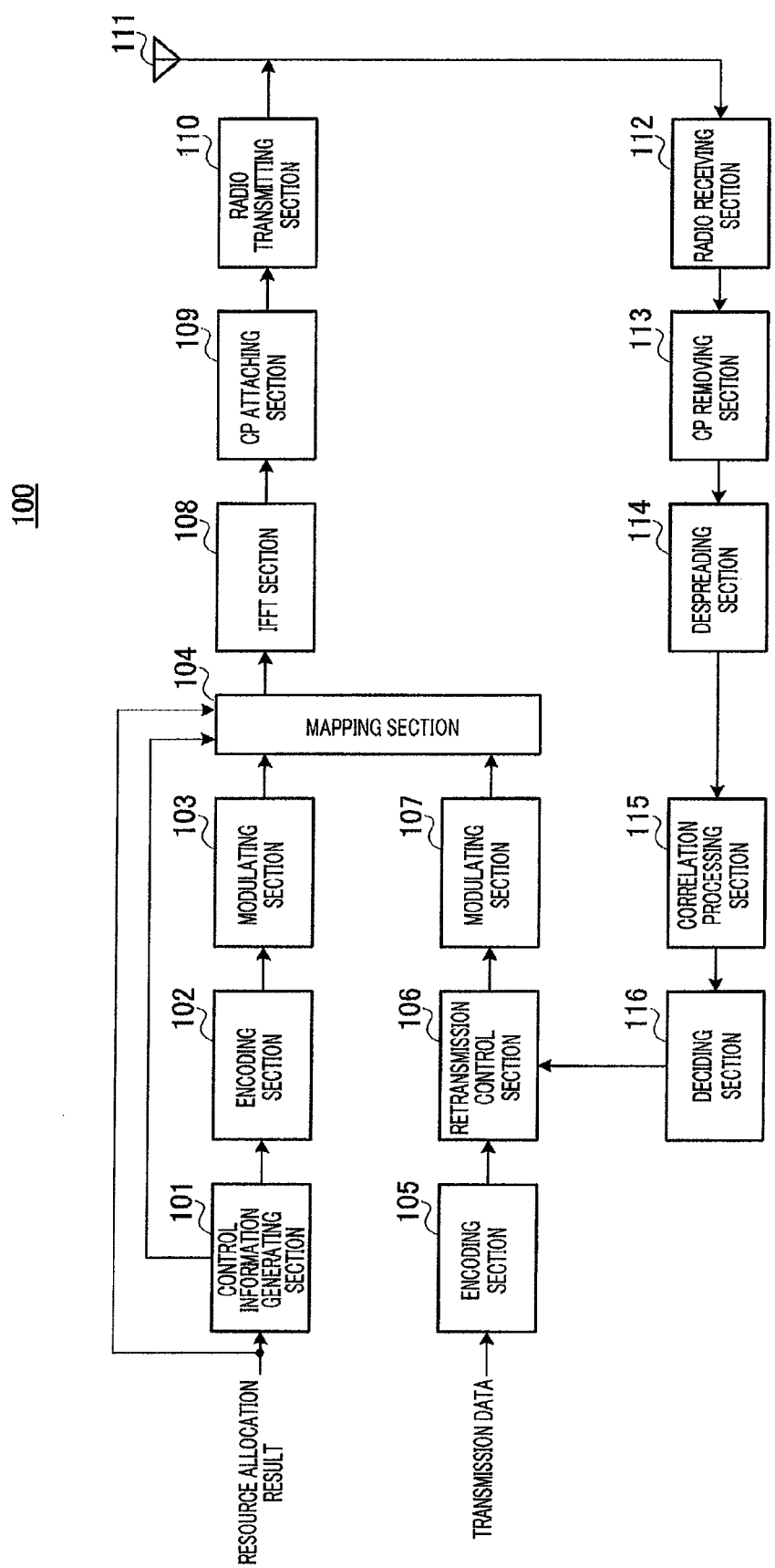
FIG. 2 is a block diagram showing the configuration of a base station according to Embodiment 1 of the present invention.
Figure 3:
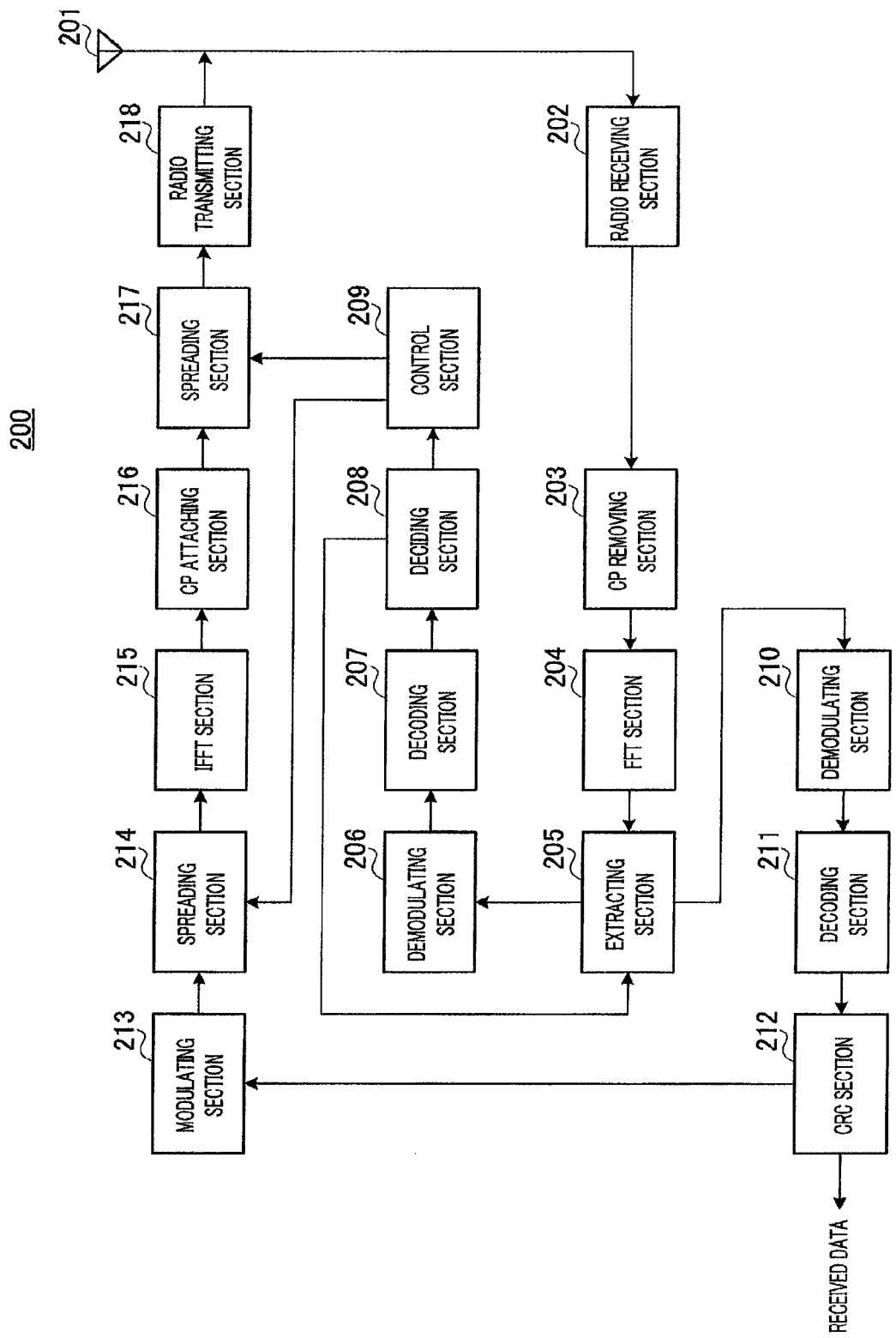
FIG. 3 is a block diagram showing the configuration of a mobile station according to Embodiment of the present invention.

FIG. 2 illustrates the configuration of base station 100 according to the present embodiment, and FIG. 3 illustrates the configuration of mobile station 200 according to the present embodiment.

Here, to avoid complicated explanation, FIG. 2 illustrates components associated with transmission of downlink data and components associated with reception of uplink response signals to the downlink data, which are closely related to the present invention, and the illustration and explanation of the components associated with reception of uplink data will be omitted. Similarly, FIG. 3 illustrates components associated with reception of downlink data and components associated with transmission of uplink response signals to the downlink data, which are closely related to the present invention, and the illustration and explanation of the components associated with transmission of uplink data will be omitted.

Also, in the following explanation, a case will be described where ZC sequences are used in first spreading and Walsh sequences are used in second spreading. Here, for the first spreading, it is equally possible to use sequences that are separable from each other because of different cyclic shift values, other than ZC sequences. Similarly, for second spreading, it is equally possible to use orthogonal sequences other than Walsh sequences.

Further, in the following explanation, a case will be described where a ZC sequence having a sequence length of 12 and a Walsh sequence having a sequence length of 4 ($W_0$, $W_1$, $W_2$, $W_3$) are used. However, the present invention is not limited to these sequence lengths.

Further, in the following explanation, twelve ZC sequences of the cyclic shift values "0" to "11" will be referred to as "ZC #0" to "ZC #11," and four Walsh sequences of sequence numbers "0" to "3" will be referred to as "W #0" to "W #3."

Further, a case will be described with the following explanation where three Walsh sequences, W #0 to W #2, are used among Walsh sequences W #0 to W #3.

Also, as shown in FIG. 4, the PUCCH numbers are defined by the cyclic shift values of ZC sequences and Walsh sequence numbers. The following explanation assumes that the PUCCH numbers are associated with the CCE numbers on a one-to-one basis.

In base station 100 shown in FIG. 2, control information generating section 101 and mapping section 104 receive as input a resource allocation result of downlink data.

Control information generating section 101 generates control information per mobile station to carry the resource allocation result, and outputs the control information to encoding section 102. Control information, which is provided per mobile station, includes mobile station ID information to indicate to which mobile station the control information is directed. For example, control information includes, as mobile station ID information, a CRC masked by the ID number of the mobile station to which control information is carried. Control information is encoded in encoding section 102, modulated in modulating section 103 and received as input in mapping section 104, on a per mobile station basis. Further, control information generating section 101 allocates an L1/L2 CCH to each mobile station, based on the number of CCE's required to carry control information (i.e. the number of CCE's occupied), and outputs the CCE number corresponding to the allocated L1/L2 CCH to mapping section 104.

In the following, the coding rate of an L1/L2 CCH is one of 2/3, 1/3 and 1/6, and an L1/L2 CCH of the coding rate 2/3 occupies one CCE. Therefore, an L1/L2 CCH of the coding rate 1/3 occupies two CCE's, and an L1/L2 CCH of the coding rate 1/6 occupies four CCE's. For example, if mobile station 200 is located far from base station 100 and has lower received quality, an L1/L2 CCH in encoding section 102 has a lower coding rate, and, consequently, the number of CCE's increases. By contrast, if mobile station 200 is located near base station 100 and has higher received quality, an L1/L2 CCH in encoding section 102 has a higher coding rate, and, consequently, the number of CCE's decreases. That is, an L1/L2 CCH of a lower coding rate occupies a larger number of CCE's, and an L1/L2 CCH of a higher coding rate occupies a smaller number of CCE's. In other words, mobile station 200 to which an L1/L2 of a low coding rate is allocated has a large number of CCE's, and mobile station 200 to which an L1/L2 of a high coding rate is allocated has a small number of CCE's.

Also, a control information generation in control information generating section 101 will be described later in detail.

On the other hand, encoding section 105 encodes transmission data for each mobile station (i.e. downlink data) and outputs the encoded transmission data to retransmission control section 106.

Upon initial transmission, retransmission control section 106 holds the encoded transmission data on a per mobile station basis, and outputs the data to modulating section 107. Retransmission control section 106 holds transmission data until retransmission control section 106 receives as input an ACK of each mobile station from deciding section 116. Further, upon receiving as input a NACK of each mobile station from deciding section 116, that is, upon retransmission, retransmission control section 106 outputs the transmission data corresponding to that NACK to modulating section 107.

Modulating section 107 modulates the encoded transmission data received as input from retransmission control section 106, and outputs the result to mapping section 104.

Upon transmission of control information, mapping section 104 maps the control information received as input from modulating section 103 on a physical resource based on the CCE number received as input from control information generating section 101, and outputs the result to IFFT section 108. That is, mapping section 104 maps control information on the subcarrier corresponding to the CCE number in a plurality of subcarriers comprised of an OFDM symbol, on a per mobile station basis.

On the other hand, upon transmission of downlink data, mapping section 104 maps the transmission data per mobile station on a physical resource based on the resource allocation result, and outputs the result to IFFT section 108. That is, based on the resource allocation result, mapping section 104 maps transmission data on a subcarrier in a plurality of subcarriers comprised of an OFDM symbol, on a per mobile station basis.

IFFT section 108 generates an OFDM symbol by performing an IFFT of a plurality of subcarriers on which control information or transmission data is mapped, and outputs the OFDM symbol to CP (Cyclic Prefix) attaching section 109.

CP attaching section 109 attaches the same signal as the signal at the tail end part of the OFDM symbol, to the head of the OFDM symbol, as a CP.

Radio transmitting section 110 performs transmission processing such as D/A conversion, amplification and up-conversion on the OFDM symbol with a CP, and transmits the result from antenna 111 to mobile station 200 (in FIG. 3).

On the other hand, radio receiving section 112 receives a response signal transmitted from mobile station 200, via antenna 111, and performs receiving processing such as down-conversion and A/D conversion on the response signal.

CP removing section 113 removes the CP attached to the response signal subjected to receiving processing.

Despreading section 114 despreads the response signal by the Walsh sequence that is used in second spreading in mobile station 200, and outputs the despread response signal to correlation processing section 115.

Correlation processing section 115 finds the correlation value between the response signal received as input from dispreading section 114, that is, the response signal spread by a ZC sequence, and the ZC sequence that is used in first spreading in mobile station 200, and outputs the correlation value to deciding section 116.

Deciding section 116 detects a correlation peak on a per mobile station basis, using a detection window set per mobile station in the time domain, thereby detecting a response signal on a per mobile station basis. For example, upon detecting a correlation peak in detection window #1 for mobile station #1, deciding section 116 detects the response signal from mobile station #1. Deciding section 116 then decides whether the detected response signal is an ACK or NACK, and outputs the ACK or NACK to retransmission control section 106, on a per mobile station basis.

On the other hand, in mobile station 200 shown in FIG. 3, radio receiving section 202 receives an OFDM symbol transmitted from base station 100, via antenna 201, and performs receiving processing such as down-conversion and A/D conversion on the OFDM symbol.

CP removing section 203 removes the CP attached to the OFDM symbol subjected to receiving processing.

FFT (Fast Fourier Transform) section 204 acquires control information or downlink data mapped on a plurality of subcarriers by performing an FFT of the OFDM symbol, and outputs the control information or downlink data to extracting section 205.

Upon receiving the control information, extracting section 205 extracts the control information from the plurality of subcarriers and outputs it to demodulating section 206. This control information is demodulated in demodulating section 206, decoded in decoding section 207 and received as input in deciding section 208.

On the other hand, upon receiving downlink data, extracting section 205 extracts the downlink data directed to the subject mobile station from the plurality of subcarriers, based on the resource allocation result received as input from deciding section 208, and outputs the downlink data to demodulating section 210. This downlink data is demodulated in demodulating section 210, decoded in decoding section 211 and received as input in CRC section 212.

CRC section 212 performs an error detection of the decoded downlink data using a CRC, generates an ACK in the case of CRC=OK (no error) and a NACK in the case of CRC=NG (error present), as a response signal, and outputs the generated response signal to modulating section 213. Further, in the case of CRC=OK (no error), CRC section 212 outputs the decoded downlink data as received data.

Deciding section 208 performs a blind detection of whether or not the control information received as input from decoding section 207 is directed to the subject mobile station. For example, deciding section 208 decides that, if CRC=OK (no error) as a result of demasking by the ID number of the subject mobile station, control information is directed to that mobile station. Further, deciding section 208 outputs the control information directed to the subject mobile station, that is, the resource allocation result of downlink data for that mobile station, to extracting section 205. Further, deciding section 208 decides a PUCCH to use to transmit a response signal from the subject mobile station, based on the CCE number corresponding to a subcarrier on which the control information directed to that mobile station is mapped, and outputs the decision result (i.e. PUCCH number) to control section 209. For example, if the CCE corresponding to a subcarrier on which control information directed to the subject mobile station is mapped is CCE #1, deciding section 208 decides the PUCCH associated with CCE #1 as the PUCCH for that mobile station. Also, for example, if the CCE's corresponding to subcarriers on which control information directed to the subject mobile station is mapped are CCE #4 and CCE #5, deciding section 208 decides that the PUCCH associated with CCE #4, which is the minimum number between CCE #4 and CCE #5, is the PUCCH for that mobile station. Also, for example, if the CCE's corresponding to subcarriers on which control information directed to the subject mobile station is mapped are CCE #8 to CCE #11, deciding section 208 decides that the PUCCH associated with CCE #8, which is the minimum number among CCE #8 to CCE #11, is the PUCCH for that mobile station.

Based on the PUCCH number received as input from deciding section 208, control section 209 controls the cyclic shift value of a ZC sequence that is used in first spreading in spreading section 214 and a Walsh sequence that is used in second spreading in spreading section 217. That is, control section 209 sets a ZC sequence of the cyclic shift value associated with the PUCCH number received as input from deciding section 208, in spreading section 214, and sets the Walsh sequence associated with the PUCCH number received as input from deciding section 208, in spreading section 217.

The sequence control in control section 209 will be described later in detail.

Modulating section 213 modulates the response signal received as input from CRC section 212 and outputs the result to spreading section 214.

Figure 1:
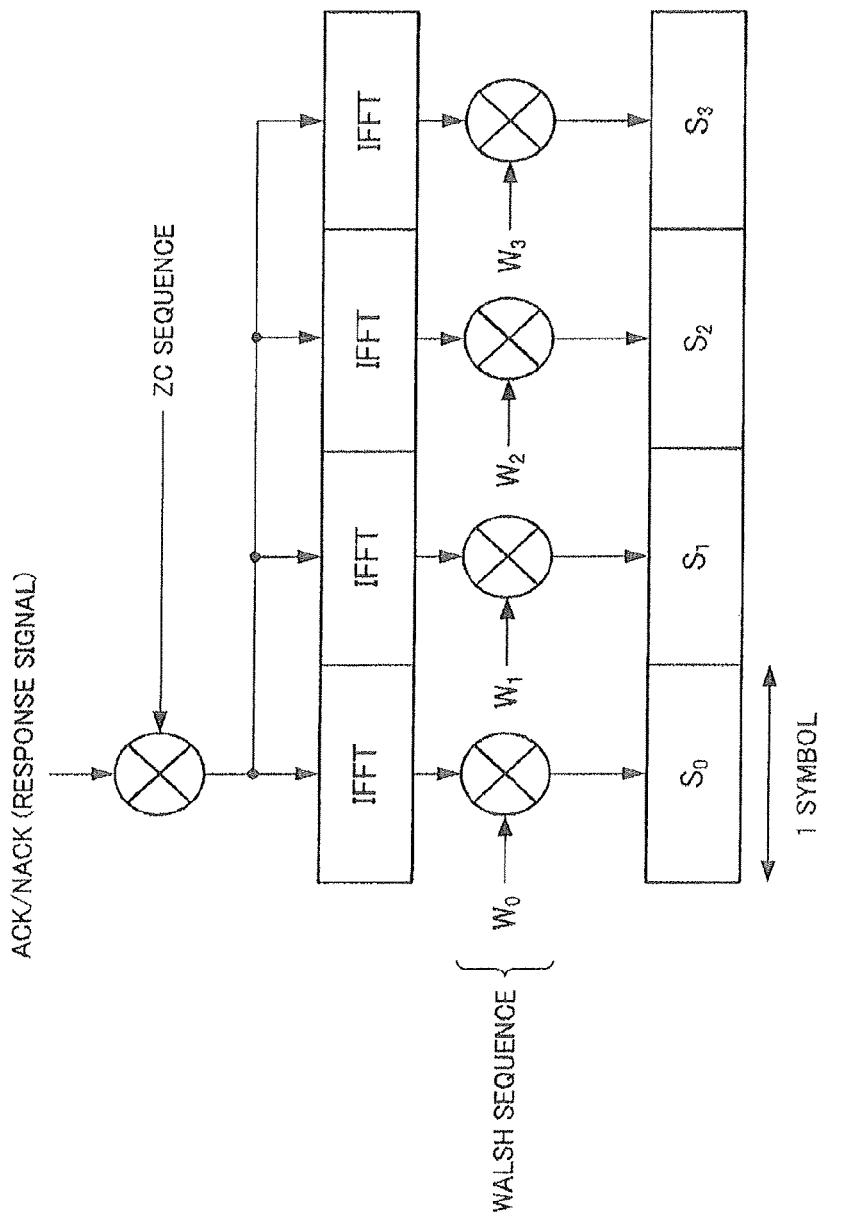
FIG. 1 is a diagram showing a spreading method of response signals (prior art)

As shown in FIG. 1, spreading section 214 performs first spreading of the response signal by the ZC sequence set in control section 209, and outputs the response signal subjected to first spreading to IFFT section 215.

As shown in FIG. 1, IFFT section 215 performs an IFFT of the response signal subjected to first spreading, and outputs the response signal subjected to an IFFT to CP attaching section 216.

CP attaching section 216 attaches the same signal as the tail end part of the response signal subjected to an IFFT, to the head of the response signal as a CP.

As shown in FIG. 1, spreading section 217 performs second spreading of the response signal with a CP by the Walsh sequence set in control section 209, and outputs the response signal subjected to second spreading to radio transmitting section 218.

Radio transmitting section 218 performs transmission processing such as D/A conversion, amplification and up-conversion on the response signal subjected to second spreading, and transmits the resulting signal from antenna 201 to base station 100 (in FIG. 2).

According to the present embodiment, a response signal is subjected to two-dimensional spreading, by first spreading using a ZC sequence and second spreading using a Walsh sequence. That is to say, the present embodiment spreads a response signal on the cyclic shift axis and on the Walsh axis.

Next, sequence control in control section 209 will be explained in detail.

In code multiplexing by first spreading using a ZC sequence, that is, in code multiplexing on the cyclic shift axis, as described above, a sufficient difference is provided between the cyclic shift values of ZC sequences, to an extent that does not cause inter-code interference between the ZC sequences. Therefore, the orthogonality between ZC sequences is little likely to collapse. Also, even if there is a mobile station that moves fast, the orthogonality between ZC sequences does not collapse. On the other hand, in code-multiplexing by second spreading using a Walsh sequence, that is, in code-multiplexing on the Walsh axis, the orthogonality between Walsh sequences is likely to collapse when there is a mobile station that moves fast. Therefore, upon code-multiplexing response signals by second spreading, it may be preferable to increase the average multiplexing level on the cyclic shift axis where orthogonality is little likely to collapse, and decrease the average multiplexing level on the Walsh axis where orthogonality is likely to collapse. Also, it may be preferable to equalize (unify) the multiplexing level on the Walsh axis between ZC sequences, in order to avoid the situation that, only for the response signal subjected to first spreading by a certain ZC sequence, the multiplexing level on the Walsh axis is extremely high. That is, when a response signal is subject to two-dimensional spreading on both the cyclic shift axis and the Walsh axis, it may be preferable to reduce the average multiplexing level on the Walsh axis and equalize (unify) the multiplexing levels on the Walsh axis between ZC sequences.

Figure 5:
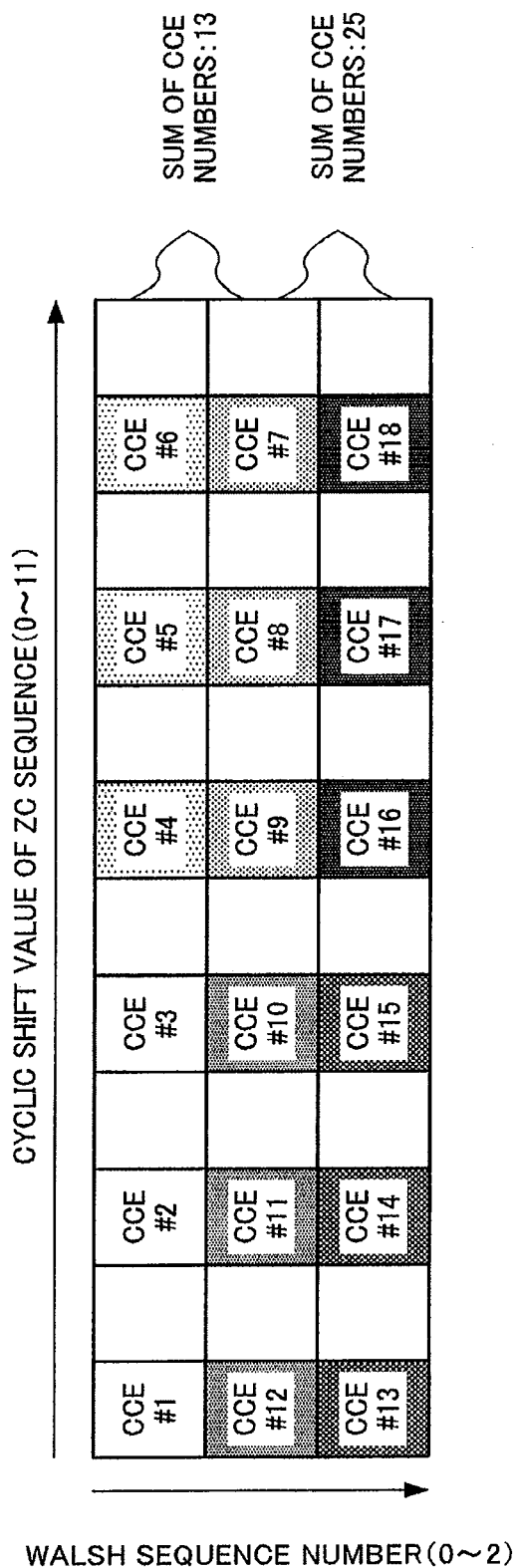
FIG. 5 illustrates associations of ZC sequences and Walsh sequences with CCE's according to Embodiment 1 of the present invention.

That is, the present embodiment controls ZC sequences and Walsh sequences based on the associations shown in FIG. 5. That is, control section 209 controls the cyclic shift value of a ZC sequence that is used in first spreading in spreading section 214 and a Walsh sequence that is used in second spreading in spreading section 217 based on the associations shown in FIG. 5.

Here, in CCE #1 to CCE #18 shown in FIG. 5, probability P to use physical resources for response signals (i.e. physical resources for PUCCH) associated with the CCE numbers or the priority level of CCE's decreases in order from CCE #1, CCE #2, ..., CCE #17 and CCE #18. That is, in FIG. 5, when the CCE number increases, the above probability P monotonically decreases. Therefore, the present embodiment associates CCE's with ZC sequences and Walsh sequences, as shown in FIG. 5.

That is, referring to the first row (W #1) and second row (W #2) on the Walsh axis in FIG. 5, PUCCH #1 associated with CCE #1 and PUCCH #12 associated with CCE #12 are multiplexed, and PUCCH #2 associated with CCE #2 and PUCCH #11 associated with CCE #11 are multiplexed. Therefore, the sum of the CCE numbers of CCE #1 and CCE #12, "13," is equal to the sum of the CCE numbers of CCE #2 and CCE #11, "13." That is, on the Walsh axis, CCE's of small numbers and CCE's of large numbers are combined and allocated. Also, PUCCH #1 and PUCCH #12 are both spread by ZC #0, and PUCCH #2 and PUCCH #11 are both spread by ZC #2. The same applies to CCE #3 to CCE #10. Further, the same applies to the second row (W #1) and third row (W #2) on the Walsh axis. That is, between ZC sequences in FIG. 5, the sum of the CCE numbers of adjacent Walsh sequences is equal. In other words, in FIG. 5, the average multiplexing levels on the Walsh axis are substantially equal (substantially uniform) between ZC sequences.

Thus, the present embodiment associates CCE's (i.e. PUCCH's) with sequences that are used in two-dimensional spreading, based on probability P to use physical resources for response signals associated with the CCE numbers or on the priority level of CCE's. By this means, between ZC sequences, the average multiplexing level on the Walsh axis, that is, the expected values of the number of multiplexed PUCCH's on the Walsh axis are substantially equal (or substantially uniform). Thus, according to the present embodiment, it is less likely that, only for a response signal subjected to first spreading by a certain ZC sequence, the multiplexing level on the Walsh axis is extremely high, so that it is possible to minimize the influence when the orthogonality between Walsh sequences collapses. Therefore, according to the present embodiment, it is possible to minimize the degradation of the separation performance of response signals code-multiplexed by second spreading.

Next, a generation of control information in control information generating section 101 will be explained.

Figure 6:
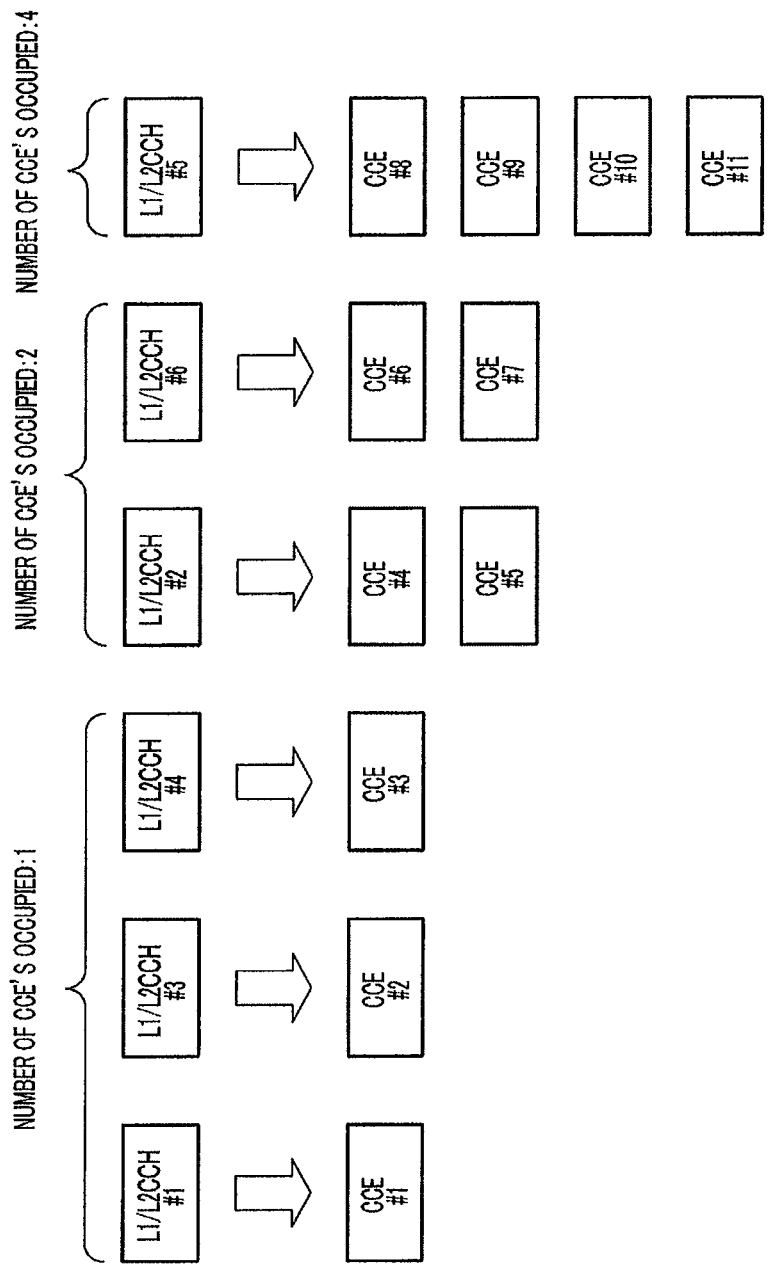
FIG. 6 illustrates mappings between L1/L2 CCH's and CCE's according to Embodiment 1 of the present invention.

As shown in FIG. 6, control information generating section 101 allocates L1/L2 CCH's based on the number of CCE's occupied, to reduce the above use probability P when the number of CCE's increases.

FIG. 6 illustrates a case where the coding rate of L1/L2 CCH #1, L1/L2 CCH #3 and L1/L2 CCH #4 is 2/3, the coding rate of L1/L2 CCH #2 and L1/L2 CCH #6 is 1/3, and the coding rate of L1/L2 CCH #5 is 1/6. Therefore, the number of CCE's occupied is 1 in L1/L2 CCH #1, L1/L2 CCH #3 and L1/L2 CCH #4, the number of CCE's occupied is 2 in L1/L2 CCH #2 and L1/L2 CCH #6, and the number of CCE's occupied is 4 in L1/L2 CCH #5.

That is, control information generating section 101 allocates L1/L2 CCH's in order from an L1/L2 CCH of a smaller number of CCE's occupied. In other words, control information generating section 101 allocates CCE's in order from the CCE of the lowest CCE number, to L1/L2 CCH's in order from the L1/L2 of the smallest number of CCE's occupied.

Here, as described above, if a plurality of CCE's are allocated to a single mobile station, the mobile station transmits a response signal using only the PUCCH associated with the CCE of the minimum number among the plurality of CCE's. In other words, if a plurality of CCE's are allocated to a single mobile station, the PUCCH's associated with the CCE's of other numbers than the minimum number among the plurality of CCE's, are not used and are therefore wasted. That is, if a plurality of CCE's are allocated to a single mobile station, unused, wasted physical resources for response signals are provided.

Also, to which mobile station downlink data is transmitted in each subframe, is determined based on, for example, the priority level of downlink data. Therefore, in a certain subframe, there is a mobile station to which downlink data is not transmitted. That is, a mobile station of the transmission destination of downlink data varies between subframes in a substantially random manner. Also, if a mobile station of the transmission destination of downlink data varies, the coding rate required in the L1/L2 CCH varies, and, consequently, the number of CCE's allocated to a single mobile station becomes random between subframes. Similarly, the number of mobile stations that occupy one CCE, the number of mobile stations that occupy two CCE's and the number of mobile stations that occupy four CCE's becomes random between subframes.

That is, as shown in FIG. 6, in a certain subframe "n," there are three mobile stations that occupy one CCE, and therefore three PUCCH's associated with CCE #1 to CCE #3, respectively, are all used. But, in the next subframe "n+1," there may be only one mobile station that occupies one CCE. In this case, in subframe n+1, CCE #2 and CCE #3 are allocated to respective single mobile stations, and, consequently, the PUCCH associated with CCE #3 is not used. That is, when the number of mobile stations that occupy only one CCE is smaller, the use probability (which is averaged over a plurality of subframes) of a PUCCH associated with a CCE of a larger CCE number monotonically decreases. That is, when the CCE number increases, the above use probability P or the above expected value E monotonically decreases.

Thus, according to the present embodiment, with an assumption that there are available resources in physical resources for response signals, control information generating section 101 allocates L1/L2 CCH's based on the number of CCE's occupied, as shown in FIG. 6. By this means, when the CCE number increases, it is possible to monotonically decrease the above use probability P in FIG. 5. That is, the present embodiment uses available resources in physical resources for response signals, thereby making the average multiplexing levels on the Walsh axis substantially equal (or substantially uniform).

Thus, according to the present embodiment, control section 209 controls the cyclic shift values of the ZC sequence and Walsh sequences based on the associations shown in FIG. 5, thereby minimizing the degradation of the separation performance of response signals code-multiplexed by second spreading. Also, control information generating section 101 allocates L1/L2 CCH's based on the number of CCE's occupied as shown in FIG. 6, thereby minimizing the waste of physical resources for response signals. That is, according to the present embodiment, it is possible to minimize the waste of physical resources for response signals and minimize the degradation of the separation performance of response signals code-multiplexed by second spreading.

(Embodiment 2)

The present embodiment is the same as in Embodiment 1 in allocating an L1/L2 CCH based on the number of CCE's occupied. Here, the present embodiment differs from Embodiment 1 in using an odd number as the minimum CCE number among the plurality of CCE's when a plurality of CCE's are allocated to one mobile station.

Figure 7:
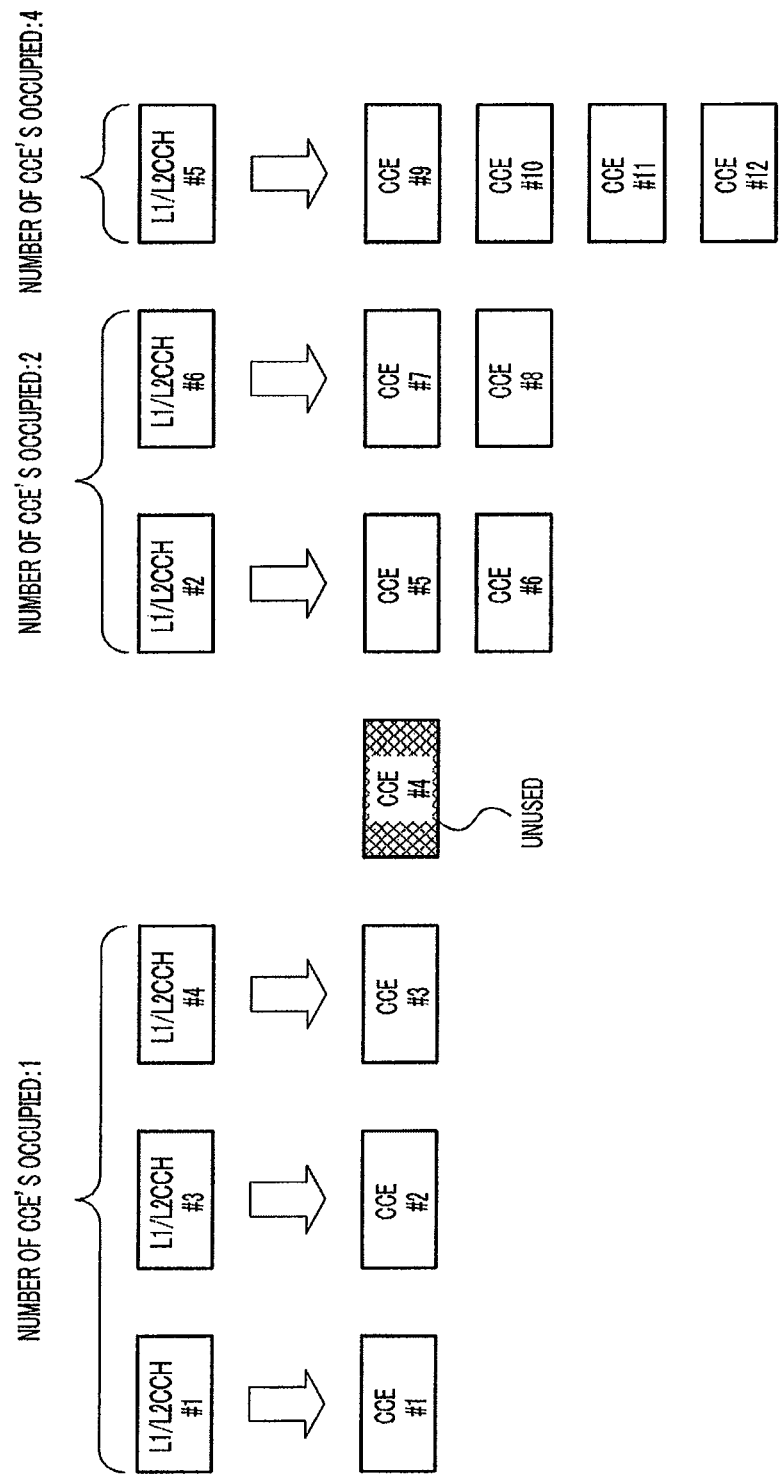
FIG. 7 illustrates mappings between L1/L2 CCH's and CCE's according to Embodiment 2 of the present invention.

That is, control information generating section 101 according to the present embodiment allocates L1/L2 CCH's as shown in, for example, FIG. 7. That is, while, with Embodiment 1 (FIG. 6), L1/L2 CCH #2 occupies CCE #4 and CCE #5, L1/L2 CCH #6 occupies CCE #6 and CCE #7, and L1/L2 CCH #5 occupies CCE #8 to CCE #11, with the present embodiment, by not using CCE #4 as shown in FIG. 7, L1/L2 CCH #2 occupies CCE #5 and CCE #6, L1/L2 CCH #6 occupies CCE #7 and CCE #8, and L1/L2 CCH #5 occupies CCE #9 and CCE #12.

By performing L1/L2 CCH allocation as shown in FIG. 7, mobile stations, to which a plurality of CCE's are allocated, always use physical resources for response signals associated with odd-numbered CCE's. Therefore, when the CCE number increases, it is possible to significantly reduce the above use probability P of physical resources for response signals associated with even-numbered CCE's. That is, according to the present embodiment, it is possible to reduce the above use probability P of physical resources for response signals associated with even-numbered CCE's, while increasing the above use probability P of physical resources for response signals associated with odd-numbered CCE's.

Figure 8:
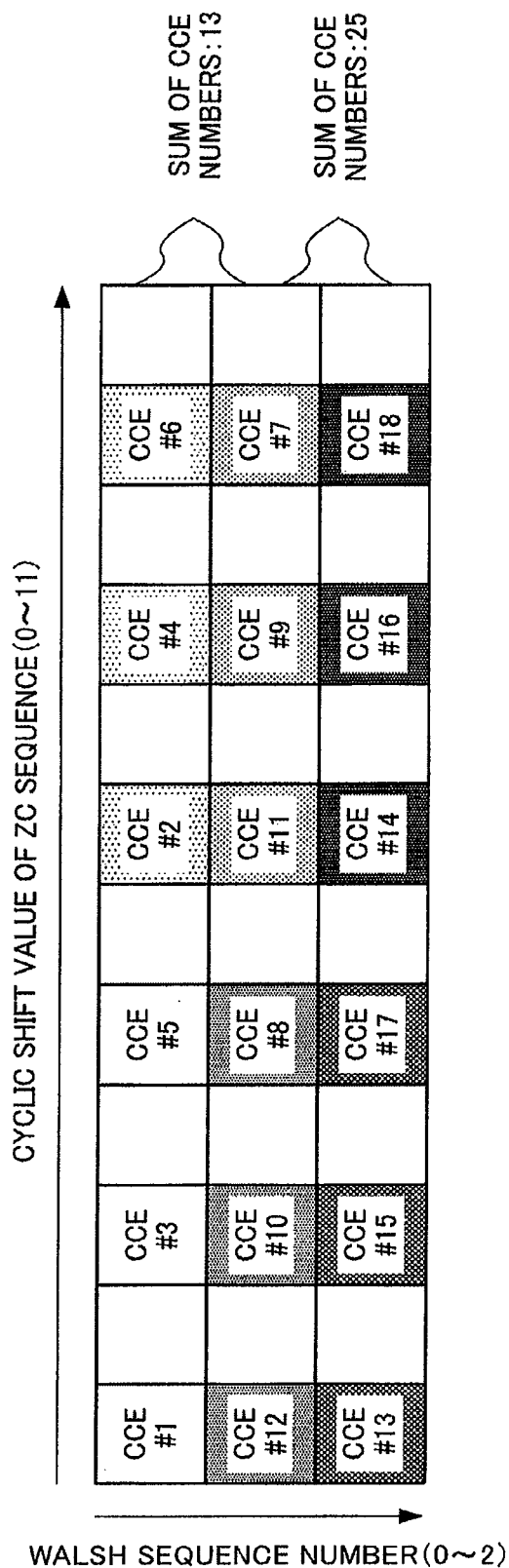
FIG. 8 illustrates associations of ZC sequences and Walsh sequences with CCE's according to Embodiment 2 of the present invention.

Also, when control information generating section 101 performs L1/L2 CCH allocation as shown in FIG. 7, based on the associations shown in FIG. 8, control section 209 controls the cyclic shift value of the ZC sequence used in first spreading in spreading section 214 and the Walsh sequence used in second spreading in spreading section 217. In FIG. 8, physical resources for response signals associated with odd-numbered CCE's (with a high use probability P) and physical resources for response signals associated with even-numbered CCE's (with a low use probability P) are allocated on the Walsh axis of the same ZC sequence, respectively. Therefore, referring to the first row (W #0) and the second row (W #1) on the Walsh axis shown in FIG. 8, PUCCH #1 associated with CCE #1 and PUCCH #12 associated with CCE #12 are multiplexed, and PUCCH #2 associated with CCE #3 and PUCCH #11 associated with CCE #10 are multiplexed. Therefore, the sum of the CCE numbers of CCE #1 and CCE #12, "13," is equal to the sum of the CCE numbers of CCE #3 and CCE #10, "13." By this means, according to the present embodiment, between ZC sequences, as in Embodiment 1 (FIG. 5), it is possible to substantially equalize (unify) the average multiplexing level on the Walsh axis.

(Embodiment 3)

The present embodiment further takes into account the collapse of orthogonality between ZC sequences on the cyclic shift axis.

If the transmission timing difference in mobile stations, the delay time of delay waves or frequency offset increases, inter-code interference is caused between adjacent ZC sequences.

Figure 9:
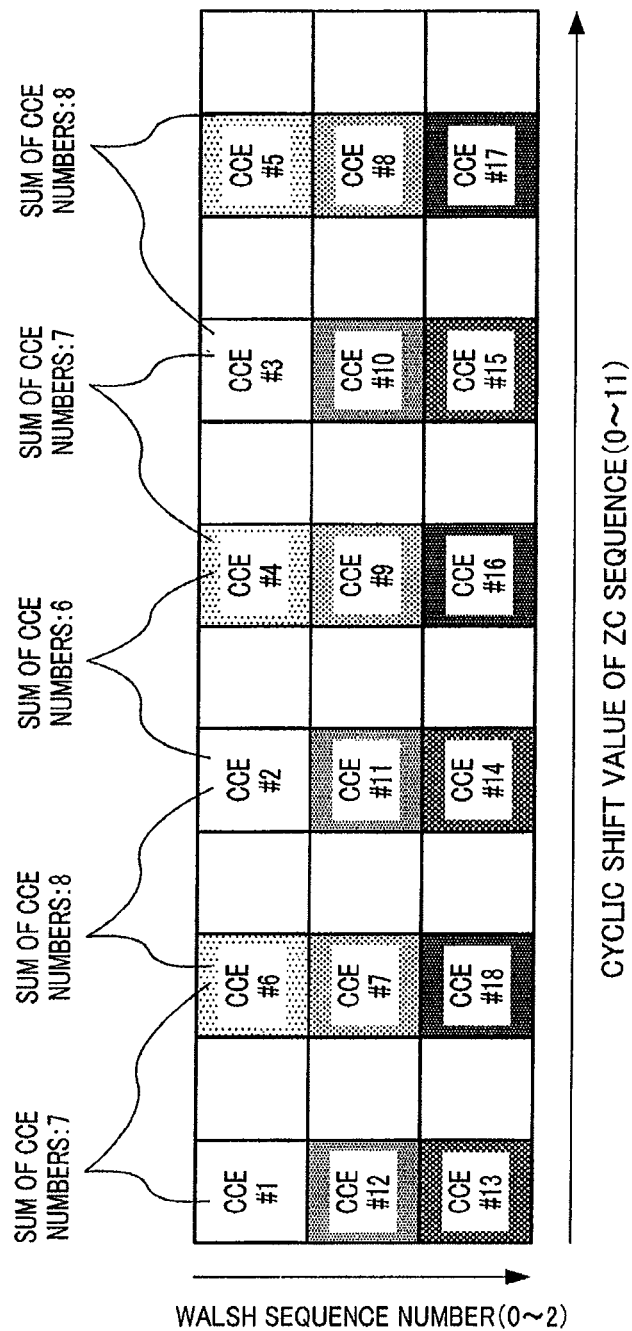
FIG. 9 illustrates associations of ZC sequences and Walsh sequences with CCE's according to Embodiment 3 of the present invention.

Therefore, with the present embodiment, as shown in FIG. 9, physical resources for response signals with a high use probability P are not placed adjacently but are placed in a distributed manner.

That is, for example, referring to the first row (W #0) and the second row (W #1) on the Walsh axis shown in FIG. 9, PUCCH #1 associated with CCE #1 and PUCCH #12 associated with CCE #12 are multiplexed, and PUCCH #2 associated with CCE #6 and PUCCH #11 associated with CCE #7 are multiplexed. Therefore, the sum of the CCE numbers of CCE #1 and CCE #12, "13," is equal to the sum of the CCE numbers of CCE #6 and CCE #7, "13."Therefore, according to the present embodiment, as in Embodiment 1 (FIG. 5) and Embodiment 2 (FIG. 8), between ZC sequences, it is possible to substantially equalize (unify) the average multiplexing level on the Walsh axis.

Further, referring to the first column, the third column, the fifth column and the seventh column on the cyclic shift axis (i.e. ZC #0, ZC #2, ZC #4 and ZC #6) in FIG. 9, PUCCH #1 associated with CCE #1, PUCCH #2 associated with CCE #6, PUCCH #3 associated with CCE #2 and PUCCH #4 associated with CCE #4 are code-multiplexed using ZC #0, ZC #2, ZC #4 and ZC #6 of adjacent cyclic shift values. Therefore, the sum of the CCE numbers of CCE #1 and CCE #6, "7," the sum of the CCE numbers of CCE #6 and CCE #2, "8," and the sum of the CCE numbers of CCE #2 and CCE #4, "6," are substantially equal.

By this means, with the present embodiment, it is possible to reduce the possibility that a plurality of mobile stations using the same Walsh sequence use a plurality of adjacent ZC sequences at the same time. Therefore, with the present embodiment, even in a communication environment in which the orthogonality on the cyclic shift axis is less likely to be maintained, it is possible to minimize the degradation of the separation performance of response signals.

(Embodiment 4)

A case will be described with the present embodiment where CCE's are used for both downlink data allocation and uplink data allocation, that is, where a downlink L1/L2 CCH and an uplink L1/L2 CCH both occupies CCE's.

Figure 10:
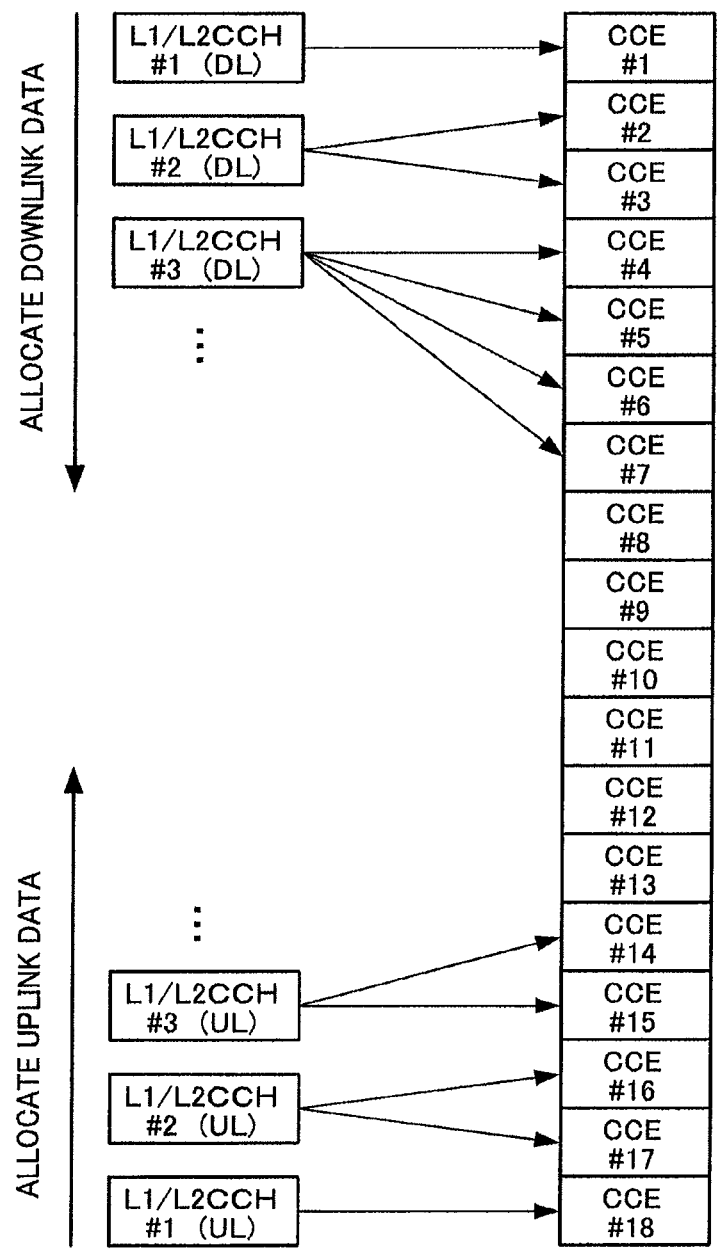
FIG. 10 illustrates mappings between L1/L2 CCH's and CCE's according to Embodiment 4 of the present invention (variation 1)
Figure 11:
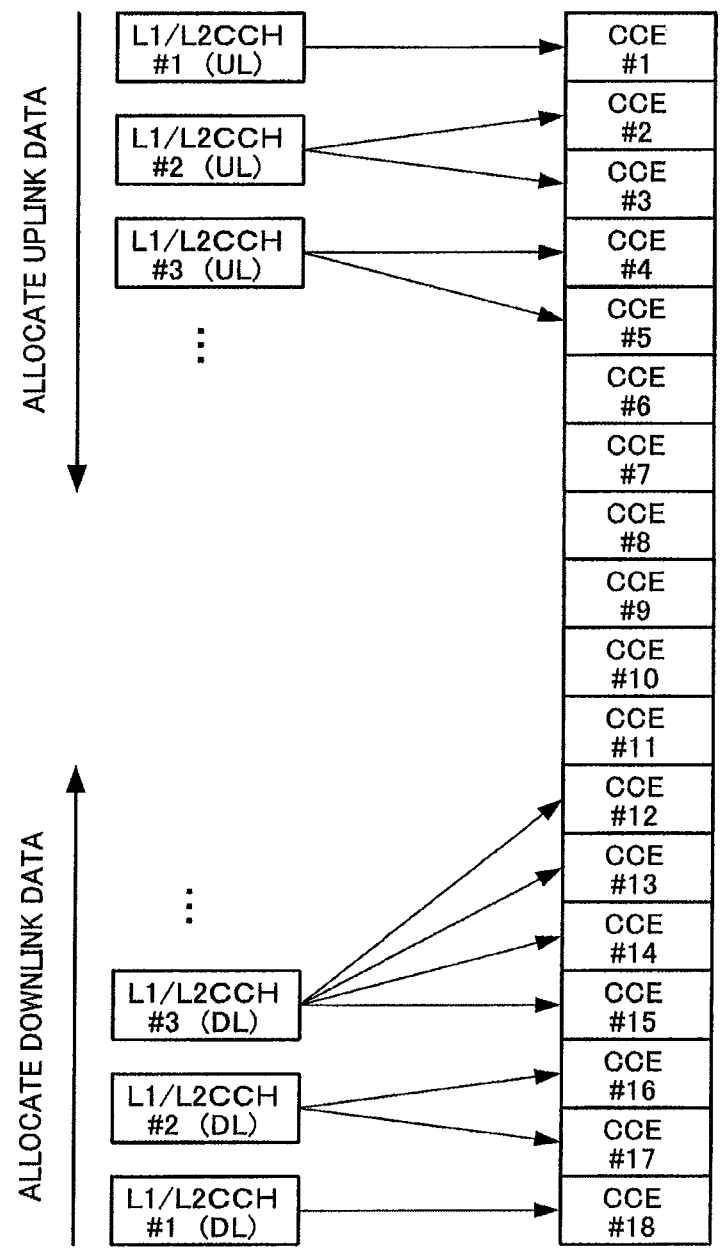
FIG. 11 illustrates mappings between L1/L2 CCH's and CCE's according to Embodiment 4 of the present invention (variation 2)

In this case, control information generating section 101 may allocate L1/L2 CCH's as shown in FIG. 10 or FIG. 11. That is, as in Embodiment 1 (FIG. 6), control information generating section 101 allocates L1/L2 CCE's in order from the L1/L2 CCH of the smallest number of CCE's occupied.

Here, as shown in FIG. 10, control information generating section 101 allocates CCE's in order from the CCE of the lowest CCE number, to downlink L1/L2 CCH's in order from the downlink L1/L2 CCH of the lowest channel number, while allocating CCE's in order from the CCE of the highest CCE number, to uplink L1/L2 CCH's in order from the uplink L1/L2 CCH of the lowest channel number.

Figure 12:
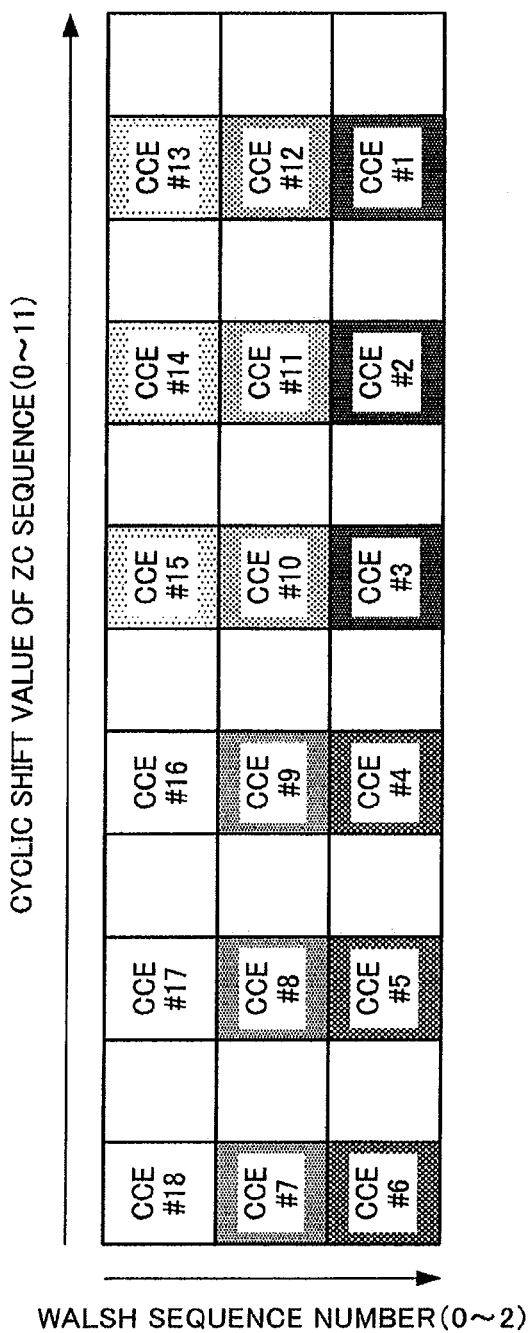
FIG. 12 illustrates associations of ZC sequences and Walsh sequences with CCE's according to Embodiment 4 of the present invention.

Alternatively, as shown in FIG. 11, control information generating section 101 allocates CCE's in order from the CCE of the lowest CCE number, to uplink L1/L2 CCH's in order from the uplink L1/L2 CCH of the lowest channel number, while allocating CCE's in order from the CCE of the highest CCE number, to downlink L1/L2 CCH's in order from the downlink L1/L2 CCH of the lowest channel number. If the L1/L2 CCH allocation shown in FIG. 11 is performed, based on the associations shown in FIG. 12, control section 209 controls the cyclic shift value of the ZC sequence used in first spreading in spreading section 214 and the Walsh sequence used in second spreading in spreading section 217. In FIG. 12, the above use possibility P or the above priority level decreases in order from CCE #18, CCE #17, . . . , CCE #2 and CCE #1.

Therefore, according to the present embodiment, even if CCE's are used for both downlink data allocation and uplink data allocation, it is possible to provide the same effect as in Embodiment 1.

(Embodiment 5)

A case will be described with the present embodiment where, because there is no mobile station that moves fast, inter-code interference is more likely to occur between ZC sequences than between Walsh sequences.

Figure 13:
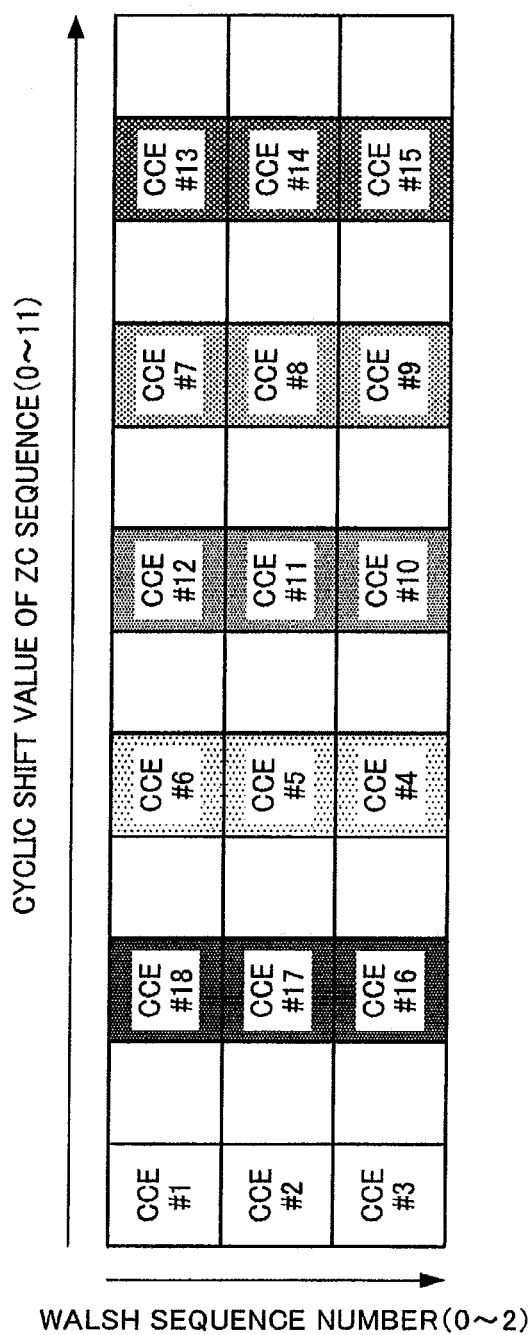
FIG. 13 illustrates associations of ZC sequences and Walsh sequences with CCE's according to Embodiment 5 of the present invention (variation 1)

In this case, referring to only the inter-code interference between adjacent ZC sequences on the cyclic shift axis, as shown in FIG. 13, it is preferable to increase the number of response signals multiplexed, preferentially on the Walsh axis at first. By this means, it is possible to reduce the possibility that a plurality of ZC sequences having adjacent cyclic shift values are used at the same time. Also, in FIG. 13, as in Embodiment 1 (FIG. 5), the above use probability P or the above priority level decreases in order from CCE #1, CCE #2, . . . , CCE #17 and CCE #18.

Figure 14:
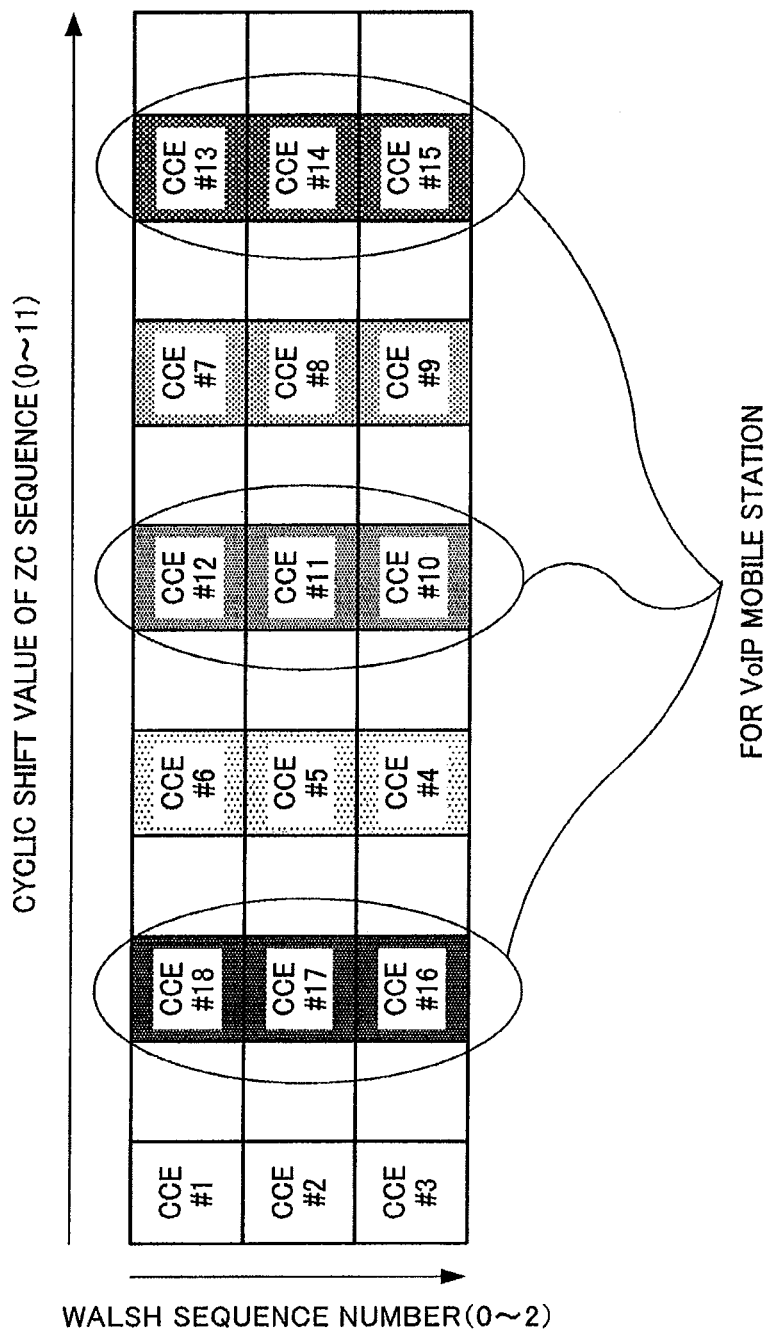
FIG. 14 illustrates associations of ZC sequences and Walsh sequences with CCE's according to Embodiment 5 of the present invention (variation 2)

Also, if mobile station 200 is the mobile station that performs communication using VoIP (Voice over Internet Protocol) (i.e. VoIP mobile station), base station 100 periodically transmits downlink data to the VoIP mobile station based on the compression rate of voice data. By this means, studies are underway to report in advance a resource allocation result of downlink data in a higher layer than the physical layer, to a VoIP mobile station. That is, control information is not transmitted to a VoIP mobile station using L1/L2 channels, and, consequently, the VoIP mobile station cannot decide PUCCH's that are used to transmit response signals, from CCE numbers. Therefore, as in the case of physical resources for data, physical resources for response signals that are used in a VoIP mobile station are reported in advance in a higher layer than the physical layer. Therefore, as shown in FIG. 14, it may be preferable to allocate physical resources for response signals of the low use probability P or the low priority level, to a VoIP mobile station. Also, in FIG. 14, as in Embodiment 1 (FIG. 5), the above use probability P or the above priority level decreases in order from CCE #1, CCE #2, . . . , CCE #17 and CCE #18. Also, in a frame in which a response signal from a VoIP mobile station is assumed to transmit, it may be preferable to use CCE #10 to CCE #18 for reporting a resource allocation result of uplink data or allocate these to an L1/L2 CCE that occupies a plurality of CCE's. By this means, it is possible to prevent a collision between a response signal from a VoIP mobile station and a response signal from a normal mobile station other than the VoIP mobile station.

(Embodiment 6)

The present embodiment reduces the possibility that the same physical resources for response signals are used between adjacent cells at the same time.

Figure 15:
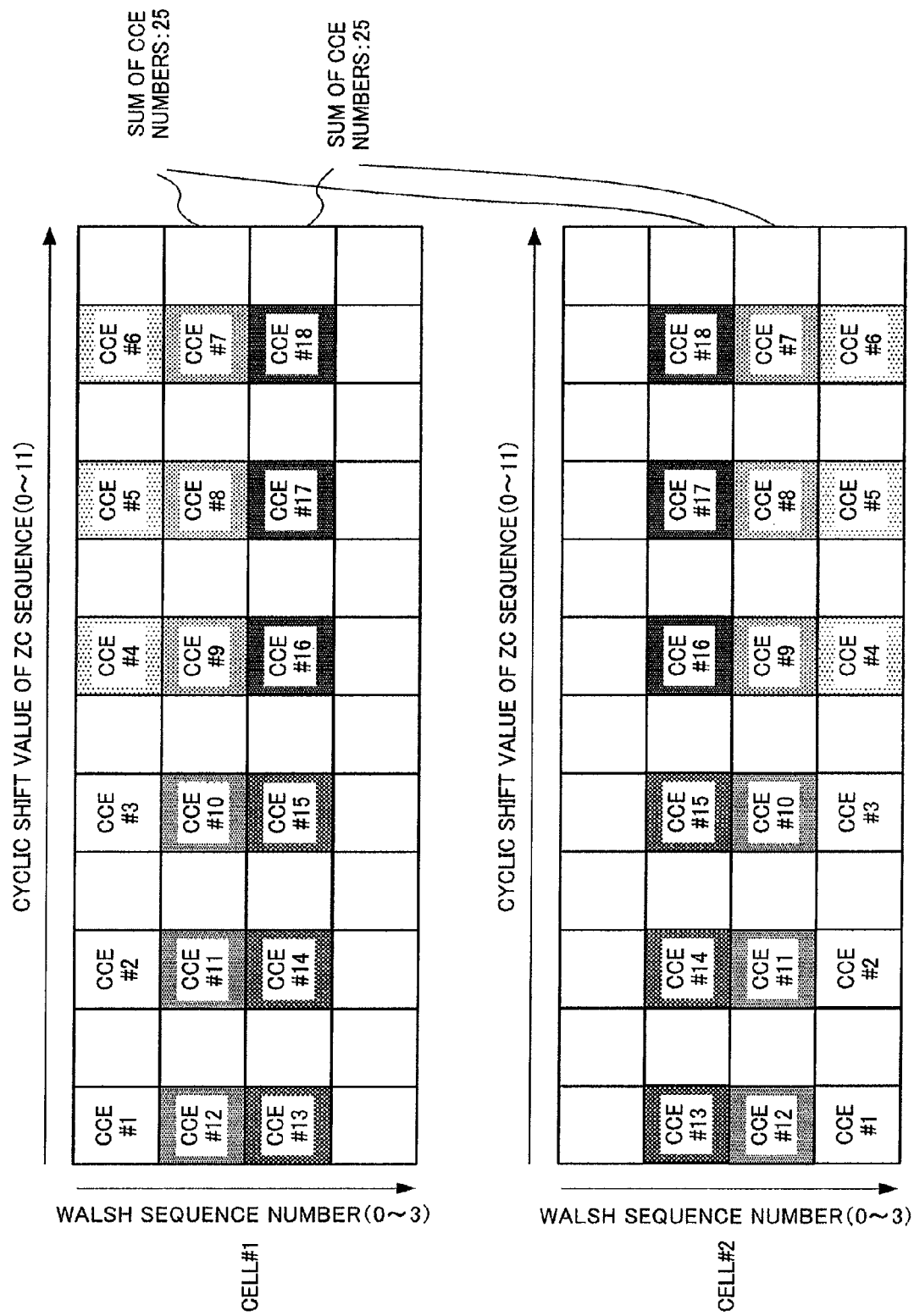
FIG. 15 illustrates associations of ZC sequences and Walsh sequences with CCE's according to Embodiment 6 of the present invention.

When cell #1 and cell #2 are adjacent to each other, ZC sequences and Walsh sequences are controlled in cell #1 based on the associations shown in the upper of FIG. 15, while ZC sequences and Walsh sequences are controlled in cell #2 based on the associations shown in the lower of FIG. 15. Also, in cell #1 and cell #2, L1/L2 CCH allocation is performed in order from the L1/L2 CCH of the smallest number of CCE's occupied. In other words, in cell #1 and cell #2, CCE's are allocated in order from the CCE of the lowest CCE number, to L1/L2 CCH's in order from the L1/L2 CCH of the smallest number of CCE's occupied. Therefore, in CCE #1 to CCE #18 shown in FIG. 15, the above use possibility P or the above priority level decreases in order from CCE #18, CCE #17, . . . , CCE #2 and CCE #1. That is, for the same physical resources for response signals, CCE numbers are associated in one cell so as to increase the above use probability, while CCE numbers are associated in the other cell so as to decrease the above use probability. By this means, between adjacent cells, it is possible to reduce the probability that ZC sequences of the same cyclic shift value or the same Walsh sequences are used at the same time.

Also, if there are physical resources for response signals that are not used in one cell, it is preferable to perform the above associating such that the physical resources for response signals that are not used in one cell are preferentially used in the other cell. FIG. 15 illustrates the case where W #3 is not used in cell #1 and W #0 is not used in cell #2.

Embodiments of the present invention have been explained above.

Also, cases have been described above with the embodiments where three Walsh sequences of Walsh sequences W #0 to W #2 are used. But, in case of using two, four or more Walsh sequences, it is equally possible to implement the present invention in the same way as above. In the case of using four or more Walsh sequences, in FIG. 6, FIG. 8 and FIG. 9, the CCE number adding 12 to the CCE number in the n-th column, needs to be allocated to the (n+2)-th column.

Also, the above embodiments show a configuration to compensate inter-code interference between Walsh sequences by the spreading gain of ZC sequence. But, the present invention is applicable not only to cases where complete orthogonal sequences such as Walsh sequences are used in second spreading, but is also applicable to cases where, for example, incomplete orthogonal sequences such as PN sequences are used in second spreading. In this case, inter-code interference due to the incomplete orthogonality of PN sequences is compensated by the spreading gain of ZC sequence. That is, the present invention is applicable to any radio communication apparatuses that use sequences, which can be separated from each other because of different cyclic shift values, for first spreading and sequences, which can be separated because of differences of sequences, for second spreading.

Figure 16:
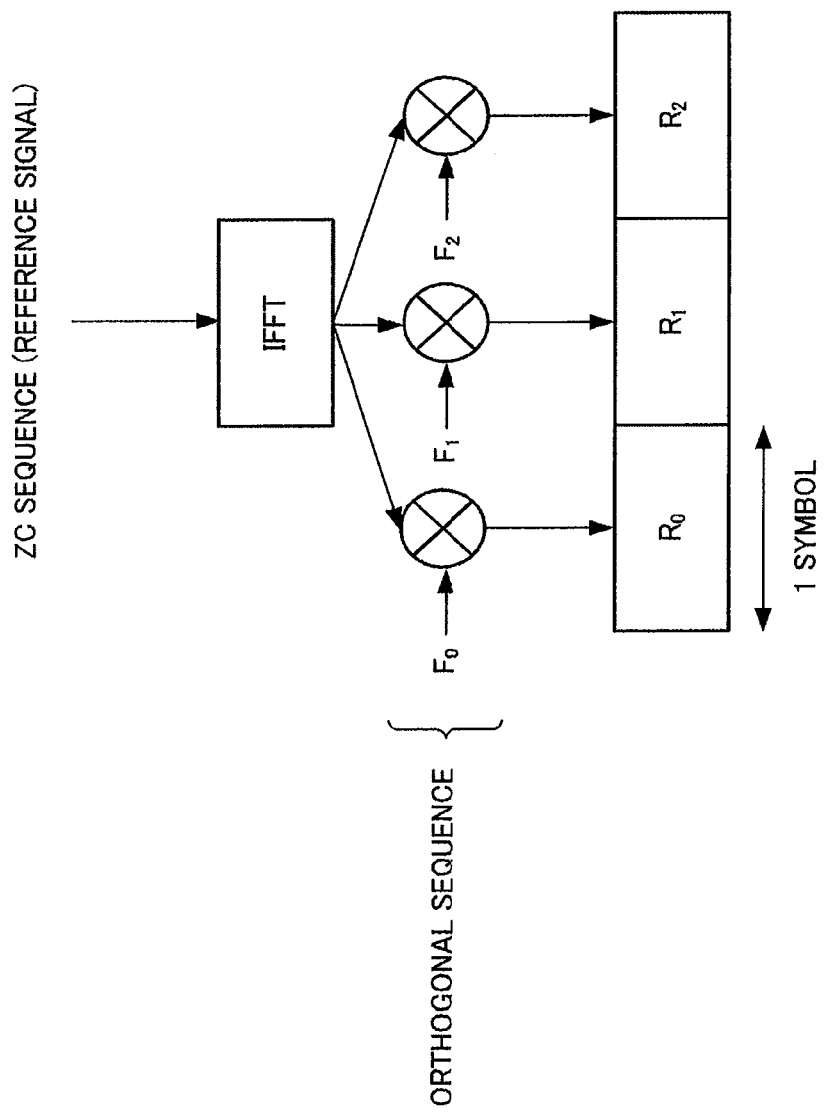
FIG. 16 illustrates a spreading method of a reference signal.

Also, cases have been described above with the embodiments where a plurality of response signals from a plurality of mobile stations are code-multiplexed. But, it is equally possible to implement the present invention even when a plurality of reference signals (e.g. pilot signals) from a plurality of mobile stations are code-multiplexed. As shown in FIG. 16, when three reference signal symbols $R_0$, $R_1$ and $R_2$, are generated from a ZC sequence (having a sequence length of 12), first, the ZC sequence is subjected to an IFFT in association with an orthogonal sequence ($F_0$, $F_1$, $F_2$) having a sequence length of 3. By this IFFT, it is possible to acquire a ZC sequence having a sequence length of 12 in the time domain. Then, the signal subjected to an IFFT is spread using the orthogonal sequence ($F_0$, $F_1$, $F_2$). That is, one reference signal (i.e. ZC sequence) is allocated to three symbols $R_0$, $R_1$ and $R_2$. Similarly, other mobile stations allocate one reference signal (i.e. ZC sequence) to three symbols $R_0$, $R_1$ and $R_2$. Here, individual mobile stations use ZC sequences of different cyclic shift values in the time domain or different Walsh sequences. In this case, the sequence length of ZC sequences in the time domain is 12, so that it is possible to use twelve ZC sequences of cyclic shift values "0" to "11," generated from the same ZC sequence. Also, the sequence length of orthogonal sequences is 3, so that it is possible to use three different orthogonal sequences. Therefore, in an ideal communication environment, it is possible to code-multiplex maximum thirty-six (12×3) response signals from mobile stations.

Also, a PUCCH used in the above-described embodiments is a channel to feed back an ACK or NACK, and therefore may be referred to as an "ACK/NACK channel."

Also, a mobile station may be referred to as "UE," a base station may be referred to as "Node B," and a subcarrier may be referred to as a "tone." Also, a CP may be referred to as a "GI (Guard Interval)."

Also, the method of detecting an error is not limited to a CRC.

Also, a method of performing transformation between the frequency domain and the time domain is not limited to IFFT and FFT.

Also, a case has been described with the above-described embodiments where the present invention is applied to mobile stations. But, the present invention is also applicable to a fixed radio communication terminal apparatus in a stationary state and a radio communication relay station apparatus that performs the same operations with a base station as a mobile station. That is, the present invention is applicable to all radio communication apparatuses.

Although a case has been described with the above embodiments as an example where the present invention is implemented with hardware, the present invention can be implemented with software.

Furthermore, each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No.2007-161969, filed on Jun. 19, 2007, including the specification, drawings and abstract, is incorporated herein by reference in its entirety.

Industrial Applicability

The present invention is applicable to, for example, mobile communication systems.

The invention claimed is:

1. A radio communication apparatus comprising:
a receiving unit configured to receive control information transmitted on one or a plurality of control channel elements (CCEs) with consecutive CCE number(s), CCEs being numbered sequentially from one; and
a spreading unit configured to first-spread a response signal with a sequence defined by a cyclic shift value that is determined among a plurality of cyclic shift values from an index of physical uplink control channel (PUCCH), which is associated with a first CCE number of said one or a plurality of CCEs, and configured to second-spread the first-spread response signal with an orthogonal sequence that is determined among a plurality of orthogonal sequences from the index;
wherein, one of cyclic shift values used for an orthogonal sequence is determined from an index of the PUCCH, which is associated with an odd CCE number, and another one of the cyclic shift values used for the same orthogonal sequence is determined from an index of the PUCCH, which is associated with an even CCE number, and the first CCE number is restricted to be an odd number when the control information is transmitted on the plurality of CCEs.

2. The radio communication apparatus according to claim 1, wherein one of two cyclic shift values that are used for the same orthogonal sequence and that are next to each other with a set interval is determined from the index of the PUCCH, which is associated with an odd CCE number and the other of the two cyclic shift values is determined from the index of the PUCCH, which is associated with an even CCE number.

3. The radio communication apparatus according to claim 1, wherein the first CCE number is not restricted to be either an odd number or an even number when the control information is transmitted on one CCE.

4. The radio communication apparatus according to claim 1, wherein the PUCCH is used for transmission of the response signal, and the first CCE number, with which an index of the PUCCH that is used only when the control information is transmitted on one CCE is associated, is restricted to be an even number.

5. The radio communication apparatus according to claim 1, wherein the PUCCH is used for transmission of the response signal, and probabilities to be used are different between the PUCCH associated with an odd CCE number and the PUCCH associated with an even CCE number.

6. The radio communication apparatus according to claim 1, wherein the index of the PUCCH is consecutively associated with the CCE number, and the cyclic shift values used for the same orthogonal sequence are respectively determined from indices of the PUCCH, which are consecutive in a direction in which the cyclic shift value is shifted.

7. The radio communication apparatus according to claim 1, further comprising a transmitting unit configured to transmit the response signal using the PUCCH.

8. The radio communication apparatus according to claim 1, further comprising a determining unit configured to determine whether or not the received control information is directed to the radio communication apparatus and configured to determine the index of the PUCCH, which is associated with the first CCE number on which the control information directed to the radio communication apparatus is transmitted.

9. The radio communication apparatus according to claim 1 wherein said spreading unit uses three orthogonal sequences.

10. The radio communication apparatus according to claim 1, wherein said spreading unit uses a sequence having a length 12 as the sequence defined by the cyclic shift value, and uses a sequence having a length 4 as the orthogonal sequence.

11. The radio communication apparatus according to claim 1, wherein the response signal is a response signal of ACK or NACK.

12. The radio communication apparatus according to claim 1, wherein one of orthogonal sequences used for a cyclic shift value is determined from an index of the PUCCH, which is associated with an odd CCE number, and another one of the orthogonal sequences used for the same cyclic shift value is determined from an index of the PUCCH, which is associated with an even CCE number.

13. The radio communication apparatus according to claim 12, wherein a number of the plurality of cyclic shift values is 12.

14. The radio communication apparatus according to claim 1, wherein:
one of two cyclic shift values that are used for the same orthogonal sequence and that are next to each other with a set interval is determined from the index of the PUCCH, which is associated with an odd CCE number and the other of the two cyclic shift values is determined from the index of the PUCCH, which is associated with an even CCE number; and
one of two orthogonal sequences that are used for a cyclic shift value and whose sequence indices are different by one is determined from the index of the PUCCH, which is associated with an odd CCE number, and the other of the two orthogonal sequences is determined from the index of the PUCCH, which is associated with an even CCE number.

15. A radio communication apparatus comprising:
a receiving unit configured to receive control information transmitted on one or a plurality of control channel elements (CCEs) with consecutive CCE number(s); and
a spreading unit configured to first-spread a response signal with a sequence defined by a cyclic shift value that is determined among a plurality of cyclic shift values from an index of physical uplink control channel (PUCCH), which is associated with a first CCE number of said one or a plurality of CCEs, and configured to second-spread the first-spread response signal with an orthogonal sequence that is determined among a plurality of orthogonal sequences from the index;
wherein the PUCCH is used for transmission of the response signal, and one of cyclic shift values used for an orthogonal sequence is determined from an index of the PUCCH, which is used when the control information is transmitted on the plurality of CCEs, and another one of the cyclic shift values used for the same orthogonal sequence is determined from an index of the PUCCH, which is used when the control information is transmitted on one CCE.

16. The radio communication apparatus according to claim 15, wherein one of two cyclic shift values that are used for the same orthogonal sequence and that are next to each other with a set interval is determined from the index of the PUCCH, which is used when the control information is transmitted on the plurality of CCEs, and the other of the two cyclic shift values is determined from the index of the PUCCH, which is used when the control information is transmitted on one CCE.

17. The radio communication apparatus according to claim 15, wherein CCEs are numbered sequentially from one, and the first CCE number is restricted to be an odd number when the control information is transmitted on the plurality of CCEs.

18. The radio communication apparatus according to claim 15, wherein CCEs are numbered sequentially from one, the first CCE number is restricted to be an odd number when the control information is transmitted on the plurality of CCEs, and the first CCE number is not restricted to be either an odd number or an even number when the control information is transmitted on one CCE.

19. The radio communication apparatus according to claim 15, wherein CCEs are numbered sequentially from one, the first CCE number is restricted to be an odd number when the control information is transmitted on the plurality of CCEs, and the first CCE number, with which the PUCCH that is used only when the control information is transmitted on one CCE is associated, is restricted to be an even number.

20. The radio communication apparatus according to claim 15, wherein one of orthogonal sequences used for a cyclic shift value is determined from an index of the PUCCH, which is used when the control information is transmitted on the plurality of CCEs, and another one of the orthogonal sequences used for the same cyclic shift value is determined from an index of the PUCCH, which is used when the control information is transmitted on one CCE.

21. The radio communication apparatus according to claim 15, wherein:
one of two cyclic shift values that are used for the same orthogonal sequence and that are next to each other with a set interval is determined from the index of the PUCCH, which is used when the control information is transmitted on the plurality of CCEs, and the other of the two cyclic shift values is determined from the index of the PUCCH, which is used when the control information is transmitted on one CCE; and
one of two orthogonal sequences that are used for a cyclic shift value and whose sequence indices are different by one is determined from the index of the PUCCH, which is used when the control information is transmitted on the plurality of CCEs, and the other of the two orthogonal sequences is determined from the index of the PUCCH, which is used when the control information is transmitted on one CCE.

22. The radio communication apparatus according to claim 15, wherein: CCEs are numbered sequentially from one; the first CCE number is restricted to be an odd number when the control information is transmitted on the plurality of CCEs; and one of orthogonal sequences used for a cyclic shift value is determined from an index of the PUCCH, which is used when the control information is transmitted on the plurality of CCEs, and another one of the orthogonal sequences used for the same cyclic shift value is determined from an index of the PUCCH, which is used when the control information is transmitted on one CCE.

23. A response signal spreading method comprising:
receiving control information transmitted on one or a plurality of control channel elements (CCEs) with consecutive CCE number(s), CCEs being numbered sequentially from one;
first-spreading a response signal with a sequence defined by a cyclic shift value that is determined among a plurality of cyclic shift values from an index of physical uplink control channel (PUCCH), which is associated with a first CCE number of said one or a plurality of CCEs; and
second-spreading the first-spread response signal with an orthogonal sequence that is determined among a plurality of orthogonal sequences from the index;
wherein one of cyclic shift values used for an orthogonal sequence is determined from an index of the PUCCH, which is associated with an odd CCE number, and another one of the cyclic shift values used for the same orthogonal sequence is determined from an index of the PUCCH, which is associated with an even CCE number, and the first CCE number is restricted to be an odd number when the control information is transmitted on the plurality of CCEs.

24. The response signal spreading method according to claim 23, wherein one of orthogonal sequences used for a cyclic shift value is determined from an index of the PUCCH, which is associated with an odd CCE number, and another one of the orthogonal sequences used for the same cyclic shift value is determined from an index of the PUCCH, which is associated with an even CCE number.

25. A radio communication apparatus comprising:
a receiving unit configured to receive control information transmitted on one or a plurality of control channel elements (CCEs) with consecutive CCE number(s); and
a spreading unit configured to first-spread a response signal with a sequence defined by a cyclic shift value that is determined among a plurality of cyclic shift values from an index of physical uplink control channel (PUCCH), which is associated with a first CCE number of said one or a plurality of CCEs, and configured to second-spread the first-spread response signal with an orthogonal sequence that is determined among a plurality of orthogonal sequences from the index;

wherein:
one of cyclic shift values used for an orthogonal sequence is determined from an index of the PUCCH, which is associated with an odd CCE number, and another one of the cyclic shift values used for the same orthogonal sequence is determined from an index of the PUCCH, which is associated with an even CCE number; and
one of orthogonal sequences used for a cyclic shift value is determined from an index of the PUCCH, which is associated with an odd CCE number, and another one of the orthogonal sequences used for the same cyclic shift value is determined from an index of the PUCCH, which is associated with an even CCE number.

26. The radio communication apparatus according to claim 25, wherein:
one of two cyclic shift values that are used for the same orthogonal sequence and that are next to each other with a set interval is determined from the index of the PUCCH, which is associated with an odd CCE number and the other of the two cyclic shift values is determined from the index of the PUCCH, which is associated with an even CCE number; and
one of two orthogonal sequences that are used for the same cyclic shift value and whose sequence indices are different by one is determined from the index of the PUCCH, which is associated with an odd CCE number, and the other of the two orthogonal sequences is determined from the index of the PUCCH, which is associated with an even CCE number.

27. The radio communication apparatus according to claim 25, wherein a number of the plurality of cyclic shift values is 12.

28. A response signal spreading method comprising:
receiving control information transmitted on one or a plurality of control channel elements (CCEs) with consecutive CCE number(s); and
first-spreading a response signal with a sequence defined by a cyclic shift value that is determined among a plurality of cyclic shift values from an index of physical uplink control channel (PUCCH), which is associated with a first CCE number of said one or a plurality of CCEs; and
second-spreading the first-spread response signal with an orthogonal sequence that is determined among a plurality of orthogonal sequences from the index;
wherein the PUCCH is used for transmission of the response signal, and one of cyclic shift values used for an orthogonal sequence is determined from an index of the PUCCH, which is used when the control information is transmitted on the plurality of CCEs, and another one of the cyclic shift values used for the same orthogonal sequence is determined from an index of the PUCCH, which is used when the control information is transmitted on one CCE.

29. The response signal spreading method according to claim 28, wherein one of orthogonal sequences used for a cyclic shift value is determined from an index of the PUCCH, which is used when the control information is transmitted on the plurality of CCEs, and another one of the orthogonal sequences used for the same cyclic shift value is determined from an index of the PUCCH, which is used when the control information is transmitted on one CCE.

30. A response signal spreading method comprising:
receiving control information transmitted on one or a plurality of control channel elements (CCEs) with consecutive CCE number(s); and
first-spreading a response signal with a sequence defined by a cyclic shift value that is determined among a plurality of cyclic shift values from an index of physical uplink control channel (PUCCH), which is associated with a first CCE number of said one or a plurality of CCEs; and
second-spreading the first-spread response signal with an orthogonal sequence that is determined among a plurality of orthogonal sequences from the index;
wherein:
one of cyclic shift values used for an orthogonal sequence is determined from an index of the PUCCH, which is associated with an odd CCE number, and another one of the cyclic shift values used for the same orthogonal sequence is determined from an index of the PUCCH, which is associated with an even CCE number; and
one of orthogonal sequences used for a cyclic shift value is determined from an index of the PUCCH, which is associated with an odd CCE number, and another one of the orthogonal sequences used for the same cyclic shift value is determined from an index of the PUCCH, which is associated with an even CCE number.

* * * * *

UNITED STATES PATENT AND TRADEMARK OFFICE
CERTIFICATE OF CORRECTION

| | | |
|---|---|---|
| PATENT NO. | : 8,514,908 B2 | Page 1 of 1 |
| APPLICATION NO. | : 13/493887 | |
| DATED | : August 20, 2013 | |
| INVENTOR(S) | : Seigo Nakao et al. | |

It is certified that error appears in the above-identified patent and that said Letters Patent is hereby corrected as shown below:

In the Claims:

Column 16, Lines 33-34:
"9. The radio communication apparatus according to claim 1 wherein said spreading unit uses three orthogonal" should read, --9. The radio communication apparatus according to claim 1, wherein said spreading unit uses three orthogonal--.

Signed and Sealed this
Twelfth Day of November, 2013

Teresa Stanek Rea
*Deputy Director of the United States Patent and Trademark Office*